(12) United States Patent
Mackie et al.

(10) Patent No.: US 11,434,307 B2
(45) Date of Patent: Sep. 6, 2022

(54) METHOD OF PROCESSING SEAWEED AND RELATED PRODUCTS

(71) Applicant: MARINE BIOPOLYMERS LTD, Ayrshire (GB)

(72) Inventors: David Mackie, Ayr Ayrshire (GB); Marianne O'Byrne, Ayr Ayrshire (GB); Audrey Jaszewski, Ayr Ayrshire (GB)

(73) Assignee: MARINE BIOPOLYMERS LTD, Ayrshire (GB)

( * ) Notice: Subject to any disclaimer, the term of this patent is extended or adjusted under 35 U.S.C. 154(b) by 0 days.

(21) Appl. No.: 16/473,073

(22) PCT Filed: Dec. 20, 2017

(86) PCT No.: PCT/GB2017/053836
§ 371 (c)(1),
(2) Date: Jun. 24, 2019

(87) PCT Pub. No.: WO2018/115867
PCT Pub. Date: Jun. 28, 2018

(65) Prior Publication Data
US 2020/0095345 A1     Mar. 26, 2020

(30) Foreign Application Priority Data
Dec. 23, 2016  (GB) .................................. 1622167

(51) Int. Cl.
C08B 37/00     (2006.01)
C08H 8/00      (2010.01)

(52) U.S. Cl.
CPC ........... *C08B 37/0084* (2013.01); *C08H 8/00* (2013.01)

(58) Field of Classification Search
CPC .......... C08H 8/00; C08B 37/0084; C08L 5/04
USPC ...................... 536/3, 30, 55.3, 56
See application file for complete search history.

(56) References Cited

U.S. PATENT DOCUMENTS

| 4,104,460 A * | 8/1978 | Hasebe ............... C08B 37/0084 |
| | | 204/157.68 |
| 2013/0264527 A1 | 10/2013 | Han et al. |

FOREIGN PATENT DOCUMENTS

| AU | 500 704 B2 * | 5/1979 | ............ C08B 37/04 |
| AU | 500704 B2 | 5/1979 | |
| EP | 2447350 A1 * | 5/2012 | ............ C11D 17/00 |
| WO | 9714780 A1 | 4/1997 | |
| WO | 2013033598 A1 | 3/2013 | |

OTHER PUBLICATIONS

International Search Report and Written Opinion corresponding to PCT/GB2017/053836, dated Jun. 15, 2018, 17 pages.
International Preliminary Report on Patentability corresponding to PCT/GB2017/053836, dated Nov. 21, 2018, 28 pages.
Wieprecht T et al., "Terpyridine-Manganese Complexes: A New Class of Bleach Catalysts for Detergent Applications", Journal of Surfactants and Detergents, Springer, Berlin, DE,vol. 7, No. 1,Jan. 1, 2004 (Jan. 1, 2004), pp. 59-66, XP001214080.

* cited by examiner

*Primary Examiner* — Ganapathy Krishnan
(74) *Attorney, Agent, or Firm* — David S. Bradin; Nexsen Pruet, PLLC

(57) ABSTRACT

There is described a process for obtaining a target chemical species, in particular alginate and/or cellulose, from seaweed. The process comprises the steps of: (i) providing a seaweed portion; (ii) bleaching the seaweed portion; and (iii) extracting the target chemical species from the seaweed portion; wherein the bleaching comprises a neutral or alkaline bleaching step, the neutral or alkaline bleaching step comprising using a bleaching composition under neutral or alkaline conditions. The neutral or alkaline bleaching step may precede the extraction step. Also described is alginate, an alginate salt, alginic acid, an alginic acid salt, an alginate derivative, an alginate derivative salt, cellulose, and/or a cellulose derivative obtained by the process.

29 Claims, 4 Drawing Sheets

METHOD OF PROCESSING SEAWEED AND RELATED PRODUCTS

RELATED APPLICATION DATA

This application is a U.S. National Phase of PCT/GB2017/053836, filed Dec. 20, 2017, which claims priority to Great Britain Patent Application Number 1622167.3 filed Dec. 23, 2016, each of which is incorporated herein by reference in its entirety for all purposes.

FIELD OF THE INVENTION

This invention relates to a method of processing seaweed, in particular brown seaweed, and related products. In particular, the invention relates to a process for obtaining a target chemical species from seaweed. In one aspect the invention relates to a process for reducing or removing colouration from seaweed or from a target chemical species extracted or derived therefrom.

BACKGROUND OF THE INVENTION

The following description will refer generally to the term "alginate(s)", which is used to refer generally to alginate(s) or salts thereof, alginic acid(s) or salts thereof, and/or alginate derivative(s) or salts thereof, unless a specific species is stated and/or the context dictates otherwise.

The following description will refer generally to the term "cellulose", which is used to refer generally to cellulose, and/or cellulose derivative(s), unless a specific species is stated and/or the context dictates otherwise.

Seaweed is a source of commercially useful products such as, for example, alginates and cellulose. To obtain such commercially useful products, it is invariably necessary to process the seaweed and, often, to extract the commercially useful product. This is the case for alginates and for cellulose.

Alginates and cellulose are used in many industries such as, for example, the food and drink industries (juice/yoghurt thickener, beer foam stabiliser, low fat spreads, bake stable fruit fillings, ice cream); the pharmaceutical and medical industries (dental impressions, antacid products, wound dressings, drug formulations); the paper and textile industries (reactive dye printing aid, sizing agent, surface finishing aid); and the nutraceutical and health industries (slimming and anti-obesity, and pre-biotics).

The different uses noted above require alginates and cellulose that have different (but predictable) chemical and physical properties, such as specific molecular weight range, viscosity and purity, as each of these factors impacts whether an alginate or a cellulose is suitable for a particular use. However, predictably obtaining such chemical and physical properties is difficult to achieve using existing alginate and/or cellulose processing techniques.

Therefore, it would be desirable to be able to process seaweed in such a way as to obtain alginates and/or cellulose that are predictable in at least some of their chemical and physical properties. In addition, it would be desirable to obtain alginates and/or cellulose of consistent purity and that have predictable and pre-selectable chemical and physical properties.

In addition to the above, often it is necessary to use alginates and/or cellulose that are colourless, or light in colour, so that the colour of the products to which they are added is not tainted by the colour of the alginates and/or cellulose. However, brown seaweeds are dark in colour, the dark colour being provided primarily by polyphenols such as, for example, phenolic acids, tannins, phlorotannins, phloroglucinols, stilbenes, lignans and flavonoids. For example, the brown seaweeds are characterised by the presence of polyphloroglucinols consisting of 1,3,5-trihydroxybenzenoid structural units. Other pigments may also be present such as, for example, pigments provided by xanthophylls (phylloxanthins), or other coloured compounds.

Conventional techniques to remove colouration from seaweed or seaweed derived products normally requires the use of toxic chemicals such as formaldehyde (methanal), or of organic solvents such as acetone or ethanol, which act as a colour setting or colour fixing agents.

However, for some applications, it is preferred to avoid the use of formaldehyde. This is because under the CLP (Harmonised Classification, Labelling and Packaging) Regulation for substances and mixtures (1272/2008/EC), formaldehyde is classified under Category 2—"Suspected Human Carcinogen". Therefore, there are at least potential environmental and safety issues when using formaldehyde. Therefore, it may be undesirable to have formaldehyde in alginates and/or cellulose, and in particular, in alginates and/or cellulose that are to be ingested or used in or on the human body.

Other conventional techniques for removal of colour from seaweed or seaweed derived products includes the use of hypochlorite bleaches. However, hypochlorite bleaches can be corrosive to apparatus, and dangerous to humans, plants and animals.

Therefore, it would be desirable to be able to extract from seaweed substantially colourless or light coloured alginates and/or cellulose that are substantially free from colouration and toxic chemicals such as formaldehyde or hypochlorite bleaches.

Also, as noted above, it is typically found that alginates and/or cellulose extracted from seaweed using conventional processing techniques have unpredictable molecular weight ranges, viscosities and purity. Therefore, it would be desirable to be able to process seaweed in such a way as to obtain alginates and/or cellulose that are predictable in at least some of their chemical and physical properties. In addition, it would be desirable to obtain alginates and/or cellulose of consistent purity and that have predictable and pre-selectable chemical and physical properties.

It is an object of the present invention to overcome or mitigate at least some of the problems of the prior art.

SUMMARY OF THE INVENTION

According to a first aspect of the invention, there is provided a process for obtaining a target chemical species from seaweed, said process comprising the steps of:
(i) providing a seaweed portion;
(ii) bleaching the seaweed portion; and
(iii) extracting the target chemical species from the seaweed portion;
   wherein the bleaching comprises a neutral or alkaline bleaching step, the neutral or alkaline bleaching step comprising using a bleaching composition under neutral or alkaline conditions.

The neutral or alkaline bleaching step may precede the extraction step.

The bleaching may comprise a first neutral or alkaline bleaching step, optionally wherein the first neutral or alkaline bleaching step precedes the extraction step.

The bleaching may comprise a second neutral or alkaline bleaching step, the second neutral or alkaline bleaching step comprising using a bleaching composition under neutral or alkaline conditions, optionally wherein the second neutral or alkaline bleaching step follows the extraction step.

One or more of the neutral or alkaline bleaching step(s) may be carried out at a pH of greater than or equal to approximately 7, optionally between approximately 7 and approximately 11, optionally between approximately 7.5 and approximately 11, optionally between approximately 8.5 and approximately 10.5, optionally between approximately 9.5 and approximately 10.5.

The pH may subsequently change to between approximately 5 and approximately 9, after the one or more of the neutral or alkaline bleaching step(s).

One or more of the neutral or alkaline bleaching step(s) may be alkaline bleaching step(s), the alkaline bleaching step(s) comprising using a bleaching composition under alkaline conditions.

One or more of the neutral or alkaline bleaching step(s) may be carried out at a temperature of between approximately 20° C. and approximately 60° C., optionally between approximately 30° C. and approximately 50° C. optionally between approximately 35° C. and approximately 45° C., optionally between approximately 35° C. and approximately 40° C.

One or more of the neutral or alkaline bleaching step(s) may be carried for between approximately 2 minutes and approximately 30 minutes, optionally between approximately 2 minutes and approximately 20 minutes, optionally between approximately 2 minutes and approximately 15 minutes.

The neutral or alkaline bleaching composition may comprise a bleaching agent.

The neutral or alkaline bleaching composition may comprise one or more of: a compound comprising a peroxide group, a compound comprising a peroxy acid group, a compound that acts as a source of peroxide group, and a compound that acts as a source of a peroxy acid group.

The neutral or alkaline bleaching composition may comprise one or more of: hydrogen peroxide, a peroxide salt, a peroxy acid, a hydroperoxide, a carbonate salt, a percarbonate salt, 6-(phthalimido) peroxyhexanoic acid (PAP), and peracetic acid.

Peracetic acid may be an equilibrium mixture of peracetic acid and water, and acetic acid and hydrogen peroxide (i.e., $CH_3COOH+H_2O_2 \rightleftharpoons CH_3CO-OOH+H_2O$).

The neutral or alkaline bleaching composition may comprise one or more of: an oxidation catalyst, a peroxide activator and a peroxy acid activator.

A peroxide activator may be a compound that reacts with a source of a peroxide group to provide a peroxide group. A peroxy acid activator may be a compound that reacts with a source of a peroxy group to provide a peroxy group.

The oxidation catalyst may be a mononuclear or dinuclear transition metal catalyst. Optionally the transition metal is manganese.

The oxidation catalyst may be selected from one or more of the group consisting of: $[(Mn^{IV})_2(\mu-O)_3(Me_3-TACN)_2]^{2+}$, $[(Mn^{III})_2(\mu-O)(\mu-CH_3COO)_2(Me_3-TACN)_2]^{2+}$, or $[Mn^{III}Mn^{IV}(\mu-O)_2(\mu-CH_3COO)(Me_4-DTNE)]^{2+}$; or suitable salts thereof.

The peroxide activator and/or the peroxy acid activator may be tetra acetyl ethylene diamine (TAED).

The neutral or alkaline bleaching composition may comprise: a carbonate ion or suitable salt thereof; hydrogen peroxide, peroxide or a suitable salt thereof; and tetra acetyl ethylene diamine (TAED).

The neutral or alkaline bleaching composition may comprise: a percarbonate ion or suitable salt thereof; and tetra acetyl ethylene diamine (TAED).

The bleaching may comprise an acid bleaching step, the acid bleaching step comprising using a bleaching composition under acid conditions. The acid bleaching step may precede the extraction step.

The acid bleaching step comprises a first acid bleaching step, optionally wherein the first acid bleaching step precedes the extraction step.

The bleaching may comprise a second acid bleaching step, the second acid bleaching step comprising using a bleaching composition under acid conditions, optionally wherein the second acid bleaching step follows the extraction step.

One or more of the acid bleaching step(s) may be carried out at a pH of between approximately 1 and approximately 3, optionally between approximately 1.5 and approximately 2.5, optionally between approximately 1.8 and approximately 2.3.

One or more of the acid bleaching step(s) may be carried out at a temperature of between approximately 15° C. and approximately 40° C., optionally between approximately 25° C. and approximately 30° C.

One or more of the acid bleaching step(s) may be carried for between approximately 10 minutes and approximately 120 minutes, optionally between approximately 15 and approximately 120, optionally between approximately 20 and approximately 120 optionally between approximately 20 minutes and approximately 110 minutes, optionally between approximately 20 minutes and approximately 100 minutes, optionally between approximately 20 minutes and approximately 90 minutes, optionally between approximately 20 minutes and approximately 80 minutes, optionally between approximately 20 minutes and approximately 70 minutes, optionally between approximately 20 minutes and approximately 60 minutes, optionally between approximately 20 minutes and approximately 50 minutes, optionally between approximately 20 minutes and approximately 40 minutes, optionally between approximately 20 minutes and approximately 30 minutes.

The acid bleaching composition may comprise a bleaching agent.

The acid bleaching composition may comprise one or more of: a compound comprising a chlorite group, and a compound that acts as a source of a chlorite group.

The acid bleaching composition may comprise one or more of: chlorine dioxide, and a chlorite salt.

The process may further comprise an aqueous wash step, optionally wherein the aqueous wash step precedes the first neutral or alkaline bleaching step.

The aqueous wash step may be carried out at a temperature of between approximately 15° C. and approximately 80° C., optionally between approximately 20° C. and approximately 70° C., optionally between approximately 25° C. and approximately 60° C., optionally between approximately 25° C. and approximately 50° C., optionally between approximately 25° C. and approximately 40° C.

The aqueous wash step may be carried for between approximately 5 minutes and approximately 40 minutes, optionally between approximately 10 minutes and approximately 30 minutes, optionally between approximately 15 minutes and approximately 30 minutes, optionally between approximately 15 minutes and approximately 25 minutes.

The aqueous wash step may comprise the use of water, optionally wherein the water is fresh water, brackish water, saline water and/or brine.

Fresh water contains less than 0.05% by weight dissolved salts, brackish water comprises from between approximately 0.05% by weight to approximately 1% by weight dissolved salts, saline water comprises from between approximately 1% by weight to approximately 5% by weight dissolved salts and brine comprises more than approximately 5% by weight dissolved salts, wherein the dissolved salts comprise sodium chloride, optionally predominantly sodium chloride.

The process may further comprise the step of pressing the seaweed portion to remove fluid therefrom, optionally wherein the pressing step precedes the first neutral or alkaline bleaching step.

The pressing step may be carried out at a pressure of from approximately 5 PSI (34.5 kPa) to approximately 50 PSI (345 kPa).

The process may further comprise an ion exchange step, optionally wherein the ion exchange step follows the first alkaline bleaching step.

Optionally, the target chemical species is ion exchanged.

The ion exchange step may further comprise the addition of acid, optionally to obtain a pH of between approximately 1.8 and approximately 3.5, optionally to obtain a pH of between approximately 2 and approximately 2.5.

The ion exchange step may be carried out for between approximately 5 minutes and approximately 60 minutes, optionally between approximately 10 minutes and approximately 50 minutes, optionally between approximately 15 minutes and approximately 40 minutes, optionally between approximately 20 minutes and approximately 30 minutes.

The process may further comprise a precipitation step, optionally wherein the precipitation step follows the extraction step.

Optionally, the target chemical species is precipitated.

The extraction step may be carried out at a pH of between approximately 6 and approximately 11.

The extraction step may also comprise converting alginic acid to sodium alginate and/or the removal of calcium.

A process as claimed in preceding claim, wherein the extraction step is carried out at a temperature of between approximately 20° C. and approximately 60° C., optionally between approximately 40° C. and approximately 50 C.

The extraction step may be carried out for between approximately 10 minutes and approximately 180 minutes, optionally between approximately 20 minutes and approximately 170 minutes, optionally between approximately 30 minutes and approximately 160 minutes, optionally between approximately 40 minutes and approximately 150 minutes, optionally between approximately 40 minutes and approximately 140 minutes, optionally between approximately 40 minutes and approximately 130 minutes, optionally between approximately 40 and approximately 120 minutes, optionally between approximately 40 and approximately 110 minutes, optionally between approximately 40 and approximately 100 minutes, optionally between approximately 40 and approximately 90 minutes, optionally between approximately 40 and approximately 80 minutes, optionally between approximately 40 and approximately 70 minutes, optionally between approximately 40 and approximately 60 minutes.

The bleaching and/or bleaching step(s) and/or the bleaching of the seaweed portion may comprise at least one of removing, substantially reducing the amount of, or masking the colour of the seaweed portion.

The seaweed portion may comprise a stipe.

The process may comprise the further step of removing at least a portion of an outwardly facing surface (surface layer) of the stipe.

Substantially all of the outwardly facing surface (surface layer) of the stipe may be removed.

The outwardly facing surface (surface layer) of the stipe that is removed may have a thickness of at least approximately 0.5 mm, optionally at least approximately 1.5 mm.

The outwardly facing surface (surface layer) of the stipe that is removed may have a thickness of between approximately 0.5 mm and approximately 2.5 mm, optionally between approximately 0.5 mm and approximately 1.5 mm.

The process may comprise the further step of dividing the stipe into a plurality of portions.

The stipe may be divided into a plurality of portions by: (i) cutting; optionally followed by (ii) milling.

The seaweed portion may comprise substantially only the stipe.

The seaweed may be selected from one or more of the group consisting of: *Laminaria hyperborea, Laminaria digitata, Lessonia trabeculata, Lessonia flavicans*, and *Lessonia brasiliensis*.

The seaweed may be *Laminaria hyperborea*.

The target chemical species may be selected from one or more of the group consisting of: alginate, an alginate salt, alginic acid, and alginic acid salt, an alginate derivative, an alginate derivative salt, cellulose and a cellulose derivative.

The process may comprise the further step of depolymerisation of the alginate or a salt thereof, optionally alginic acid or a salt thereof, optionally an alginate derivative or a salt thereof.

The process may comprise the further step of depolymerisation of the cellulose and/or the cellulose derivative.

The depolymerisation may follow the first neutral or alkaline bleaching step and precede the extraction step. The depolymerisation may follow the pressing step, precede the first neutral or alkaline bleaching step, and precede the extraction step. The depolymerisation may follow the first neutral or alkaline bleaching step and the first acid bleaching step, and precede the extraction step.

The depolymerisation may be carried out at a temperature of between approximately 70° C. and approximately 130° C.

The depolymerisation may be carried out at a pressure of between approximately 0 PSI (0 kPa) and approximately 30 PSI (208 kPa), optionally between a pressure of between approximately 0 PSI (0 kPa) and approximately 15 PSI (104 kPa).

The depolymerisation may be carried out at a pH of from approximately 2.5 to approximately 9.

The step of extracting alginate or a salt thereof, alginic acid or a salt thereof, and/or an alginate derivative or a salt thereof may comprise: treating the stipe portions with carbonate ions and/or hydroxide ions or a suitable salt thereof so forming a mixture comprising alginate or a salt thereof, optionally alginic acid or a salt thereof, optionally an alginate derivative or a salt thereof, optionally sodium alginate.

The process may comprise the further step of separating the so-formed mixture into a solution phase and residual solids.

The process may comprise the further step of adding a species that complexes with alginate to form an insoluble alginate salt, thereby forming a precipitate, the species optionally being a metal ion, optionally calcium.

The process may comprise the further step of adjusting the pH to approximately pH 2 to approximately pH 3.5, optionally using an acid, thereby causing alginic acid to precipitate therefrom.

The process may comprise the step of adjusting the pH to between approximately pH 3 and approximately pH 3.5, optionally using water.

The process may comprise the further step of adjusting the pH to approximately pH 5.5 to approximately pH 8.5, optionally approximately pH 6.5 to approximately pH 7.5, optionally using a base, optionally carbonate, optionally sodium carbonate.

According to a second aspect of the invention there is provided alginate, an alginate salt, alginic acid, an alginic acid salt, an alginate derivate, an alginate derivative salt, cellulose, a cellulose derivative, or a mixture thereof, obtainable, obtained or directly obtained by the process of the first aspect.

The alternative features and different embodiments as described for the first aspect applies to the second aspect and each and every embodiment thereof and vice versa, mutatis mutandis.

BRIEF DESCRIPTION OF THE DRAWINGS

Embodiments of the invention will now be described, by way of example only, with reference to the drawings, in which.

DETAILED DESCRIPTION

Cutting and Peeling

Figure 1A:
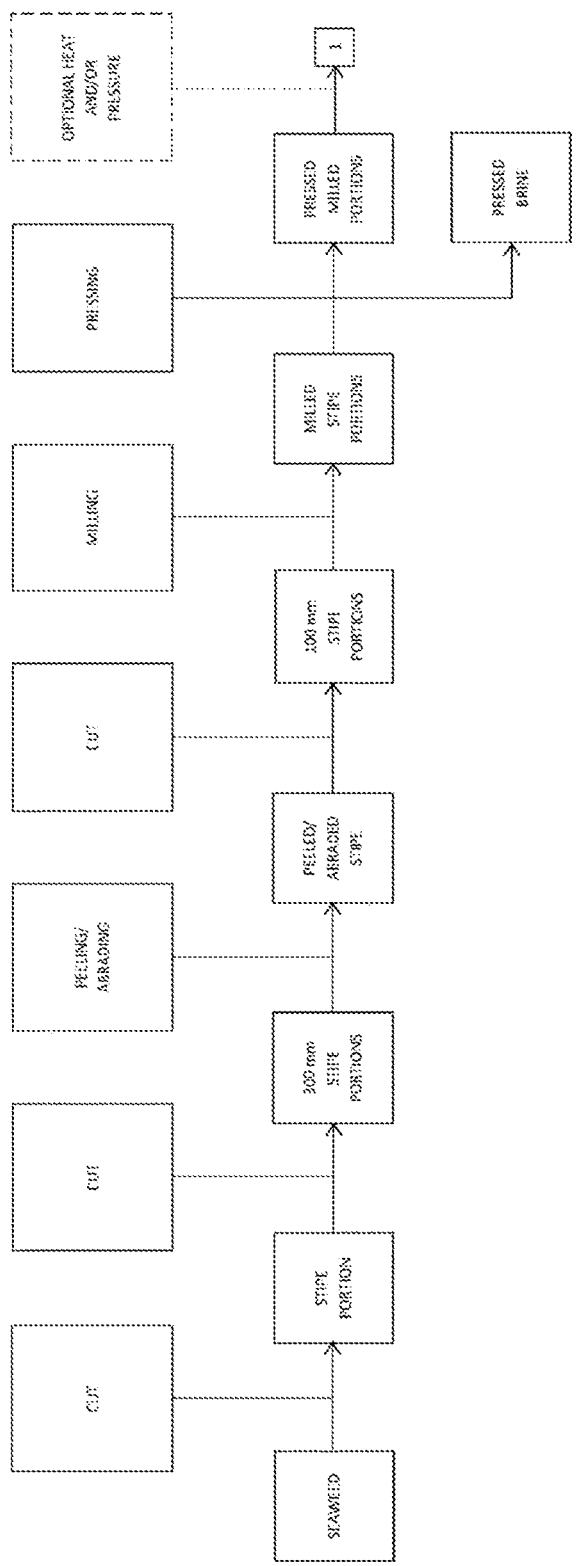
FIGS. 1A-D are flow diagrams which illustrate a process in accordance with one embodiment of the invention.
Figure 1B:
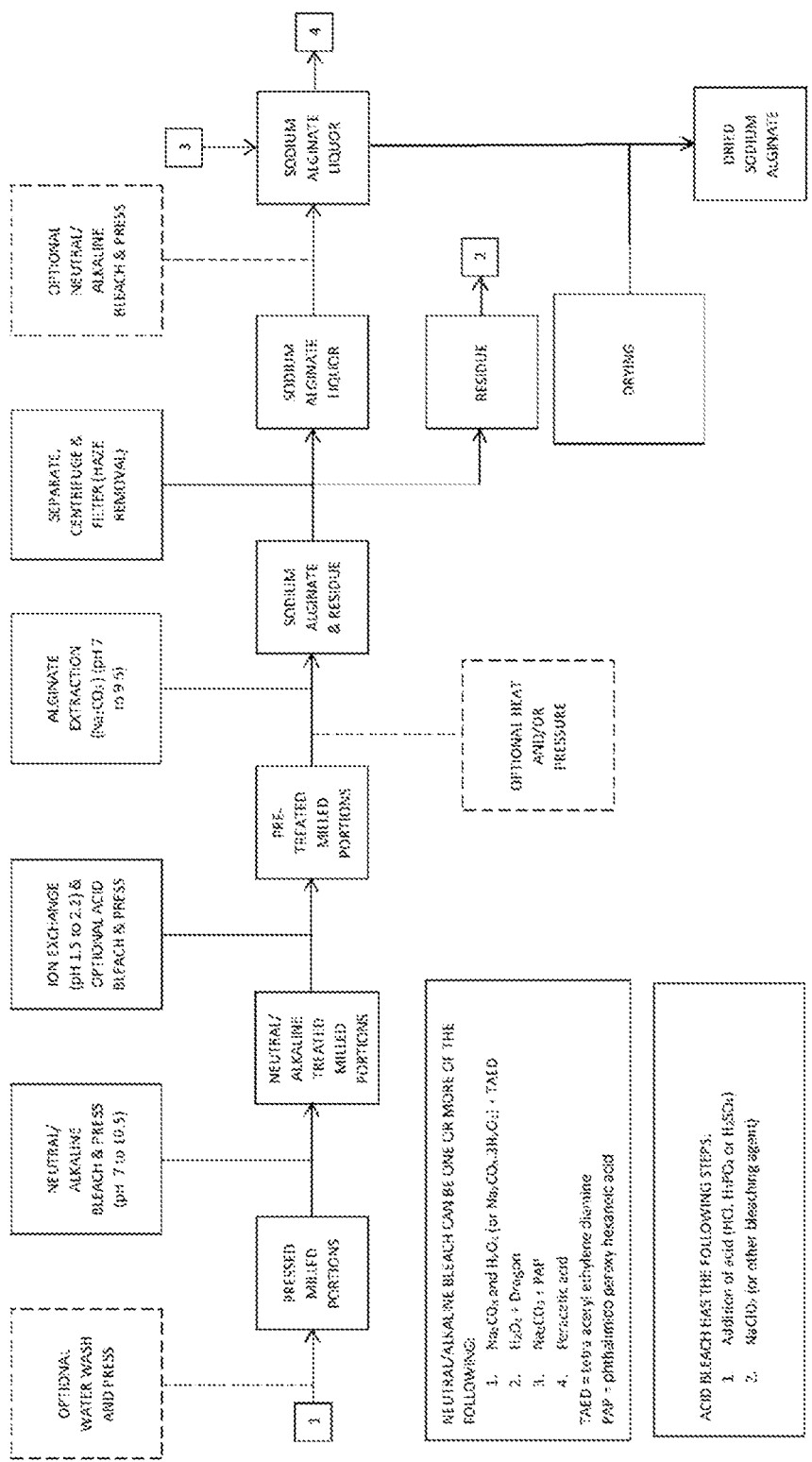
Figure 1C:
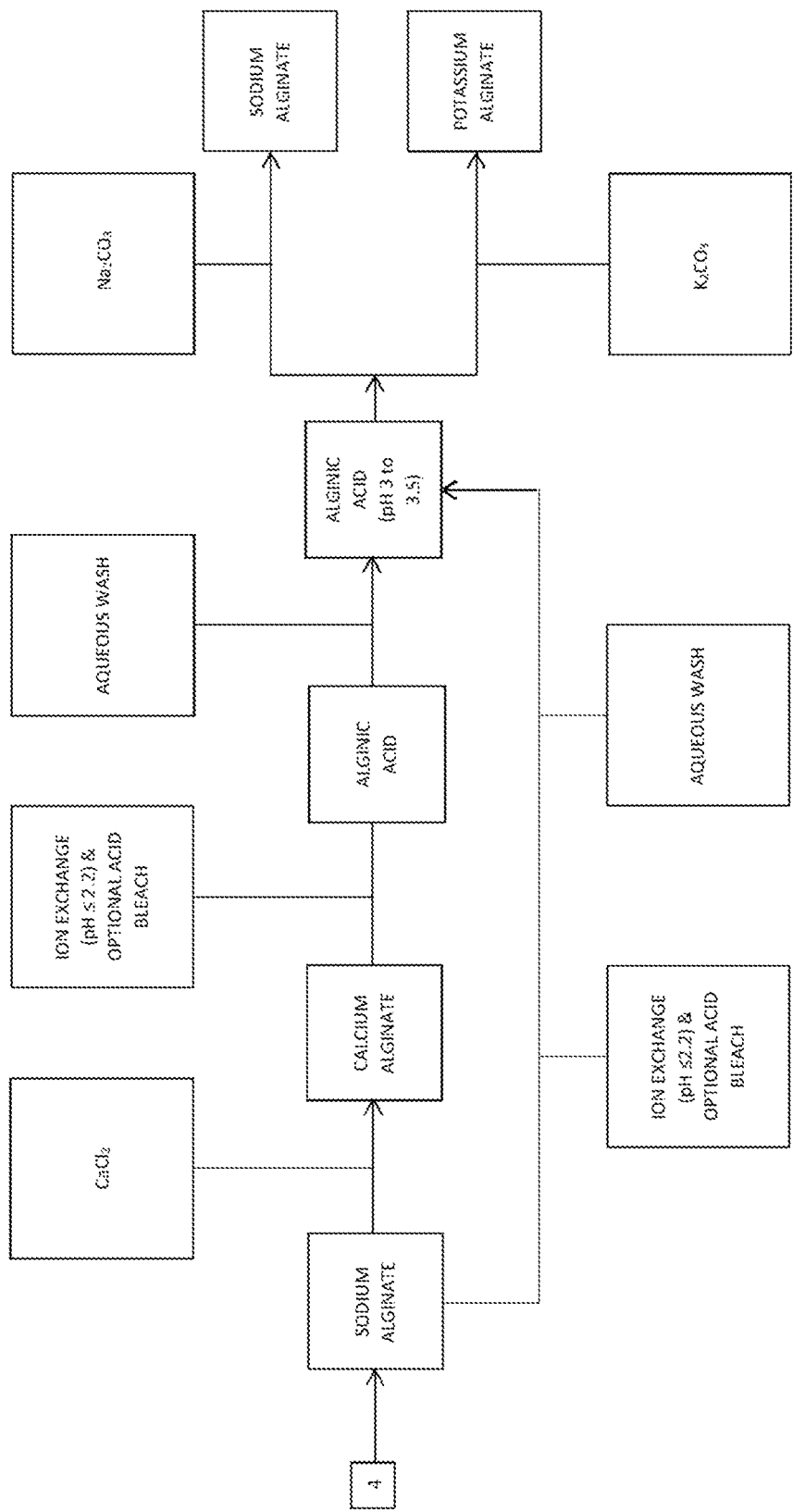
Figure 1D:
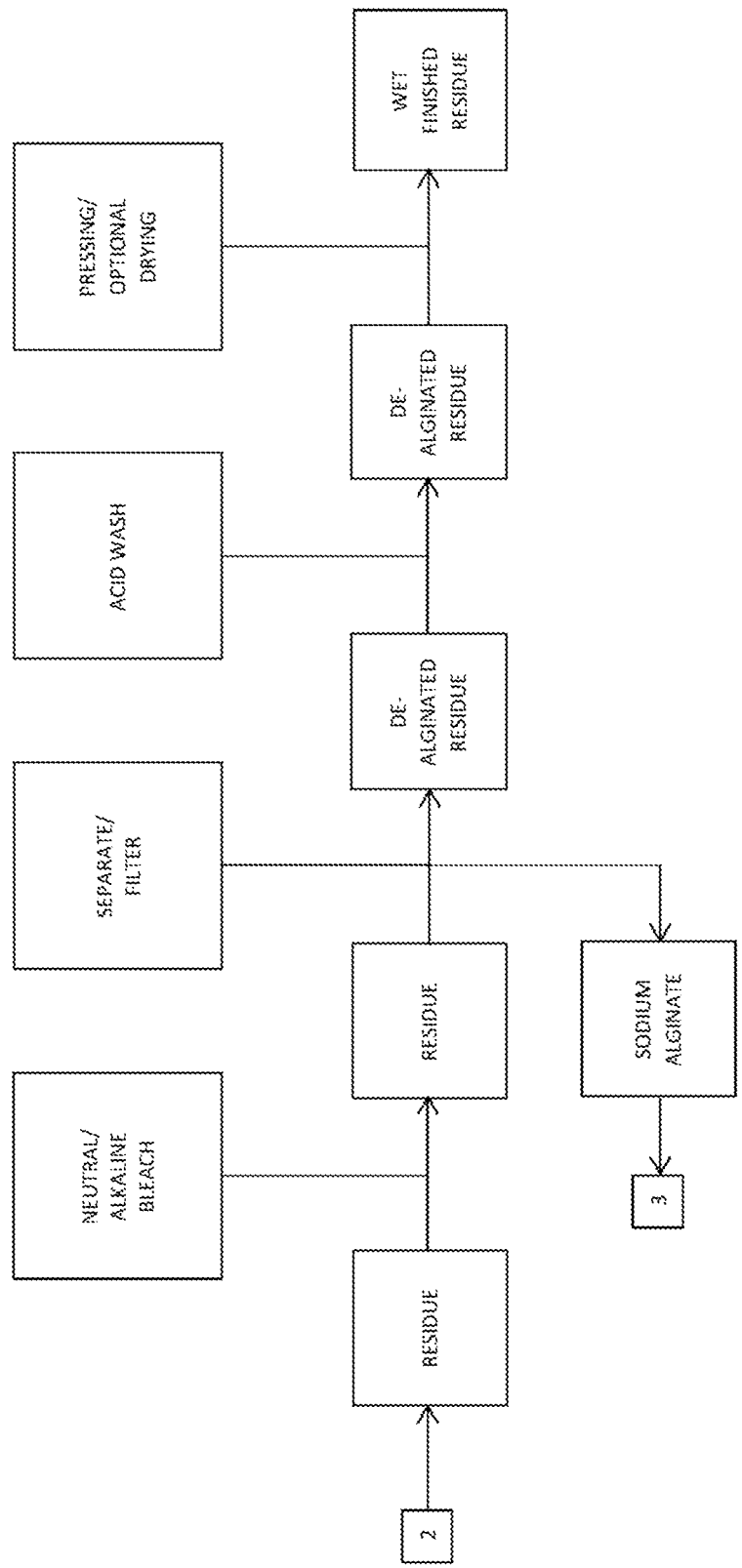

Referring to FIGS. 1A-D, there is provided seaweed (*Laminaria hyperborea*) having a stipe. The non-stipe parts of the seaweed are removed to provide a seaweed portion comprising substantially stipe only. The non-stipe parts are removed by manual or automated cutting, or some other known method. The seaweed portion is then cut into smaller portions of approximately 300 mm in length either manually (i.e., by hand) or using an automatic vegetable cutting machine, as is commonly known in the vegetable cutting industry.

The stipe of the seaweed portions is then peeled to remove the outer surface (which is sometimes referred to as the peel, skin or bark), using an automated vegetable peeling machine as is known in the art and as supplied by Sormac™. The thickness of the outer surface that is removed is approximately 1.5 mm, and is typically as low as 0.5 mm, but may be slightly thicker or thinner depending on the type, age and thickness of the seaweed being used. In particular, the thickness that is removed is typically between approximately 0.5 mm and approximately 2.5 mm, and most typically between approximately 0.5 mm and approximately 1.5 mm.

In a first example, a 300 mm long stipe weighing 296 grams had 99.5 grams of peel removed, leaving a peeled portion weighing 196.5 grams. Therefore, 9.2% by weight of the stipe was removed.

In a second example, a 300 mm long stipe weighing 122 grams had 14.8 grams of peel removed, leaving a peeled portion weighing 107.2 grams. Therefore, 12.4% by weight of the stipe was removed.

Further examples are given in Tables 1 and 2 below.

TABLE 1

Peeled and Unpeeled Weight of Stipe (wet stipe weight)

| Sample No. | Unpeeled stipe weight (grams) | Peeled stipe weight (grams) | Difference (grams) | Percentage Difference (%) |
|---|---|---|---|---|
| 1 | 297.7 | 277.7 | 20.0 | 6.7 |
| 2 | 273.3 | 261.6 | 11.7 | 4.3 |
| 3 | 219.9 | 194.0 | 25.9 | 11.8 |
| 4 | 218.9 | 197.2 | 21.7 | 9.9 |
| 5 | 208.8 | 193.5 | 15.3 | 7.3 |
| 6 | 201.1 | 181.0 | 20.1 | 10.0 |
| 7 | 190.6 | 167.4 | 23.2 | 12.2 |
| 8 | 188.7 | 172.5 | 16.2 | 8.6 |
| 9 | 184.8 | 159.5 | 25.3 | 13.7 |
| 10 | 180.9 | 161.0 | 19.9 | 11.0 |
| 11 | 165.7 | 143.4 | 22.3 | 13.5 |
| 12 | 160 | 145.4 | 14.6 | 9.1 |
| 13 | 157.2 | 139.7 | 17.5 | 11.1 |
| 14 | 149.3 | 131.7 | 17.6 | 11.8 |
| 15 | 128.9 | 113.2 | 15.7 | 12.2 |
| 16 | 112.5 | 100.3 | 12.2 | 10.8 |
| 17 | 111.1 | 95.7 | 15.4 | 13.9 |
| 18 | 105.1 | 90.4 | 14.7 | 14.0 |
| 19 | 88.4 | 76.7 | 11.7 | 13.2 |
| 20 | 86.5 | 75.4 | 11.1 | 12.8 |
| 21 | 81.7 | 68.0 | 13.7 | 16.8 |

TABLE 2

| Sample No. | Width of first end unpeeled (mm) | | Width of second end unpeeled (mm) | | Width of first end peeled (mm) | | Width of second end peeled (mm) | |
|---|---|---|---|---|---|---|---|---|
| | Thin | Wide | Thin | Wide | Thin | Wide | Thin | Wide |
| 1 | 30.21 | 33.01 | 34.94 | 39.95 | 29.05 | 32.05 | 34.42 | 38.81 |
| 2 | 36.22 | 40.90 | 28.76 | 30.45 | 34.47 | 39.32 | 26.94 | 28.98 |
| 3 | 33.18 | 40.42 | 22.51 | 28.98 | 31.72 | 38.17 | 21.01 | 27.2 |
| 4 | 25.39 | 29.58 | 29.19 | 33.06 | 23.84 | 28.63 | 28.07 | 31.99 |
| 5 | 22.31 | 28.11 | 29.75 | 33.71 | 21.16 | 27.29 | 29.16 | 31.62 |
| 6 | 30.43 | 32.78 | 24.21 | 26.81 | 29.26 | 30.84 | 23.08 | 25.97 |
| 7 | 24 26 | 26.72 | 26.91 | 29 39 | 22 94 | 25.57 | 25.63 | 26.67 |
| 8 | 28.86 | 31.83 | 24.99 | 26.71 | 28.06 | 30.42 | 23.76 | 25.69 |
| 9 | 28.81 | 31.67 | 21.64 | 23.34 | 27.83 | 30.10 | 20.24 | 21.96 |
| 10 | 28.17 | 32.50 | 24.36 | 26.21 | 26.89 | 30.28 | 22.64 | 24.41 |
| 11 | 28.21 | 30.22 | 20.64 | 22.95 | 26.30 | 28.25 | 19.17 | 21.86 |
| 12 | 21.59 | 24.91 | 25.86 | 29.10 | 20.01 | 24.08 | 24.98 | 27.68 |
| 13 | 21.75 | 24.31 | 27.31 | 28.70 | 20.39 | 22.67 | 26.32 | 27.84 |
| 14 | 22.67 | 23.21 | 24.81 | 28.06 | 21.43 | 22.07 | 23.55 | 26.86 |
| 15 | 27.59 | 30.49 | 17.67 | 20.78 | 26.77 | 29.69 | 16.66 | 19.64 |
| 16 | 17.33 | 18.68 | 21.69 | 25.19 | 16.72 | 18.11 | 21.00 | 23.69 |

TABLE 2-continued

| Sample No. | Width of first end unpeeled (mm) | | Width of second end unpeeled (mm) | | Width of first end peeled (mm) | | Width of second end peeled (mm) | |
|---|---|---|---|---|---|---|---|---|
| | Thin | Wide | Thin | Wide | Thin | Wide | Thin | Wide |
| 17 | 17.81 | 19.17 | 20.58 | 22.99 | 16.49 | 18.31 | 20.24 | 22.20 |
| 18 | 14.51 | 15.30 | 21.45 | 25.55 | 12.82 | 13.43 | 20.28 | 23.42 |
| 19 | 15.01 | 20.36 | 18.32 | 22.75 | 14.47 | 19.53 | 17.06 | 21.84 |
| 20 | 19.54 | 21.06 | 14.17 | 15.33 | 18.22 | 19.74 | 13.68 | 15.05 |
| 21 | 15.45 | 17.21 | 15.92 | 21.03 | 13.58 | 15.57 | 14.98 | 19.89 |

The "thin" and "wide" widths or diameters relate to the width or diameter of the cross-section of the stipe portion. Both a "thin" and a "wide" width or diameter are quoted as the cross-section is not necessarily round, and thus has a thinnest and a widest width or diameter.

The examples given are based on the portions of a 300 mm length of *Laminaria hyperborea* stipe. These stipe portions have different diameters depending on the age of the seaweed, and generally speaking have a thicker and a thinner end.

Therefore, the amount of the outer surface that is removed is from approximately 4% by weight to approximately 17% by weight of the total stipe weight.

The vegetable peeling machine is configured to remove substantially all of the outwardly facing surface of the stipe. This peeled section (i.e., the outwardly facing surface) includes the epidermis layer and in one embodiment may also include the meristoderm layer, epiphytes, a mucilage cuticle and/or a mucus canal.

Other suitable peeling or vegetable peeling machines can be used. Generally, the peeling machines work using a series of blades which act on the entire circumference of the stipe by the angle they are set at within the peeler. In the example given above, the blade angle is set at 12° to 23° from the horizontal axis. Other angles can also be used depending on the angle at which the stipe is present to the blade relative to the horizontal plane. The outer surface is removed as a continuous peel the entire length of the stipe to a depth of 1.5 mm on a typical stipe cut to lengths of 300 mm. However, the amount of outer surface removed is based on the age and type of seaweed being used, and is typically a ratio of the circumference to depth of cut. Experiments with *Laminaria hyperborea* have shown that the amount of outer surface removed is between approximately 4% to approximately 17% of the total weight of the wet stipe. The smaller percentage is achieved with seaweed that is less than 5 years old, and the larger percentage is achieved with seaweed that is between 3 and 10 years old.

In an alternative embodiment, the peel is removed by abrasion or scraping. For example, the stipe of the seaweed portions is abraded or scraped to remove the outer surface (which is sometimes referred to as the peel, skin or bark), using a rotating brush. Alternatively, the abrasion can be done by hand using a scourer or similar abrasive material. The thickness of the outer surface that is removed is typically between 0.5 mm and 1.5 mm, but may be slightly thicker or thinner depending on the type, age and thickness of the seaweed being used.

This outer surface of the stipe is the outwardly facing surface (or layer) of the stipe, and generally comprises compounds that give the seaweed its distinctive brown or green colouration. Therefore, removing the outwardly facing surface of the stipe aids reduction of colour in the final product extracted from the seaweed.

Milling

After peeling, the stipe is divided by cutting into several portions of approximately 100 mm each in length and using a vegetable cutting machine supplied by Sormac™. The cut stipe portions are then further divided to a chip type product by milling using a pre-breaker milling machine as is known in the art as supplied by Urschel™. For example, the Urschel™ 3500 series can be used with a prebreaker head, and followed by a second pass with finer teeth. The chip type product is then further milled using a finer screen to provide a smaller particle size and using a milling machine as is known in the art.

The milled stipe provides a plurality of stipe portions having a particle size distribution as described in Table 3 or in Table 4.

TABLE 3

Particle Size Distribution for Milled Stipe Portions (fine)

| Sieve Size | % by weight collected on sieve | % by weight passing through sieve |
|---|---|---|
| 2.36 mm | 0 | 100 |
| 1.7 mm | 7 | 93 |
| 850 μm | 67 | 26 |
| 425 μm | 12 | 14 |
| 355 μm | 10 | 4 |
| 355 μm | 3 | 1 |
| 250 μm | 1 | — |

TABLE 4

Particle Size Distribution for Milled Stipe Portions (coarse)

| Sieve Size | % by weight collected on sieve | % by weight passing through sieve |
|---|---|---|
| 4.45 mm | 0 | 100 |
| 3.35 mm | 60.7 | 39.3 |
| 2.36 mm | 6.5 | 32.8 |
| 1.7 mm | 6.7 | 26.2 |
| 850 μm | 14.5 | 11.7 |
| 425 μm | 7.6 | 4.2 |
| 355 μm | 1.3 | 2.8 |
| 355 μm | 1.5 | 1.3 |
| 250 μm | 1.3 | — |

A target chemical species is then extracted from the stipe portions, as will be further described below. In this case, the target chemical species is alginate, but it can also be cellulose or a mixture of cellulose and alginate. The target chemical species can also be two or more chemical species. For example, both alginate and cellulose can be extracted in the same process, along with (if desired) a mixture of alginate and cellulose. Alternatively, the process can be used to extract only one of alginate and cellulose, or to extract only a mixture of alginate and cellulose.

Pressing

The milled stipe portions are then pressed (or dewatered) by adding to a hydropress (such as the type typically used to extract juice from fruit and as supplied by Vigo Presses™, for example). The hydropress is typically operated at a pressure of from approximately 5 PSI (34.5 kPa) to approximately 50 PSI (345 kPa) as can be achieved with a domestic water supply, albeit it will be appreciated that the pressure applied can be higher or lower if a suitable press is used.

Pressing can also be carried out at other parts of the process. For example, before and/or after any particular chemical treatment step.

Washing

After pressing, an optional washing step is carried out. The washing step involves adding water to the milled stipe portions at a ratio of between 1:1 and 4:1, typically 3:1 (water:milled stipe) to make the seaweed fluid. The water used is at a temperature of 10° C. to 50° C. (optionally between 20° C. to 40° C.) and is mixed with the milled stipe portions for between approximately 5 and approximately 30 minutes. After this time has elapsed, the milled stipe portions are allowed to free drain, before further pressing (optionally using the pressing step as described above) to remove further water.

Whilst the temperature range typically employed is 40° C. to 50° C. it will be appreciated that other suitable temperatures can be used such as, for example, 15° C. to 80° C. Other temperature ranges suitable for use are as follows: 20° C. to 70° C., 25° C. to 60° C., 25° C. to 50° C., 20° C. to 40° C., or 25° C. to 40° C.

Whilst the time used is 5 minutes to 30 minutes, other times or time ranges may be suitable such as, for example: 5 minutes to 40 minutes, 10 minutes to 30 minutes, 10 minutes to 20 minutes, 15 minutes to 30 minutes, or 15 minutes to 25 minutes.

Whilst water can be used for washing as described above, other aqueous solutions can be used. For example, the wash step may comprise the use of water, fresh water, brackish water, saline water and/or brine.

Fresh water contains less than 0.05% by weight dissolved salts, brackish water comprises from between approximately 0.05% by weight to approximately 1% by weight dissolved salts, saline water comprises from between approximately 1% by weight to approximately 5% by weight dissolved salts and brine comprises more that approximately 5% by weight dissolved salts, wherein the dissolved salts comprises sodium chloride, optionally predominantly sodium chloride.

Neutral or Alkaline Bleaching (Pre-Extraction)

The milled stipe portions are then bleached under neutral or alkaline conditions as follows. Water is added to the milled stipe portions at a ratio of 3:1 (water:milled stipe portions). The pH is then adjusted to approximately 10.3 and a bleaching compound or composition is added and is mixed with the milled stipe portions for approximately 20 minutes at approximately 40° C. After this time has elapsed, the milled stipe portions are allowed to free drain, before further pressing (optionally using the pressing step as described above) to remove further water.

At this stage, the milled stipe portions appear lighter (ordinarily a light yellow colour) than the starting milled stipe portions.

After neutral or alkaline bleaching, the pH changes to between about 5 and about 9.

Whilst the pH used is around 10.3, other pHs or pH ranges may be suitable such as, for example: pH between 7 and 11, pH between 8.5 and 10.5, or pH between 9.5 and 10.5.

The neutral or alkaline bleaching step described above can be carried out at a variety of temperatures such as, for example, 20° C. to 60° C., 30° C. to 50° C., 35° C. to 45° C., or 35° C. to 40° C.

The neutral or alkaline bleaching step can be carried for between 2 minutes and 30 minutes, between 2 minutes and 20 minutes, or between 2 minutes and 15 minutes.

The neutral or alkaline bleaching composition used contains one or more bleaching agents. For example, it can contain one or more of: a compound comprising a peroxide group, a compound comprising a peroxy acid group, a compound that acts as a source of peroxide group, and a compound that acts as a source of a peroxy acid group. Example of such compounds are: hydrogen peroxide, peroxide salts, peroxy acids, hydroperoxides, carbonate salts, percarbonate salts, 6-(phthalimido) peroxyhexanoic acid (PAP), and peractic acid.

Peracetic acid may be an equilibrium mixture of peracetic acid and water, and acetic acid and hydrogen peroxide (i.e., $CH_3COOH + H_2O_2 \rightleftharpoons CH_3CO-OOH + H_2O$). Different mixture concentrations are used for different applications and typical of these are the grades called PERACLEAN™ as supplied by Evonik Industries (Essen, Germany). Different PERACLEAN™ grades are illustrated in Table 5.

TABLE 5

PERACLEAN™ grades

| Grade | Peracetic Acid % | Hydrogen Peroxide % |
|---|---|---|
| PERACLEAN ™ 5 | 5 | 26 |
| PERACLEAN ™ 10 | 10 | 20 |
| PERACLEAN ™ 15 | 15 | 21 |
| PERACLEAN ™ 35 | 35 | 7 |
| PERACLEAN ™ 40 | 39 | 4 |

Unless otherwise stated, experimental work that used peracetic acid was carried out using PERACLEAN™ 15, but this does not exclude the use of other grades.

If necessary or useful, the neutral or alkaline bleaching composition can also comprise one or more of: an oxidation catalyst, a peroxide activator and a peroxy acid activator.

A peroxide activator may be a compound that reacts with a source of a peroxide group to provide a peroxide group. A peroxy acid activator may be a compound that reacts with a source of a peroxy group to provide a peroxy group.

Oxidation catalysts that can be used include mononuclear or dinuclear transition metal catalysts, wherein the transition metal is manganese. Examples include: $[(Mn^{IV})_2(\mu\text{-}O)_3(Me_3\text{-}TACN)_2]^{2+}$, $[(Mn^{II})_2(\mu\text{-}O)(\mu\text{-}CH_3COO)_2(Me_3\text{-}TACN)_2]^{2+}$, $[Mn^{III}Mn^{IV}(\mu\text{-}O)_2(\mu\text{-}CH_3COO)(Me_4\text{-}DTNE)]^{2+}$; and suitable salts thereof.

An example of a suitable peroxide activator and/or peroxy acid activator is tetra acetyl ethylene diamine (TAED).

For example, suitable alkaline bleaching conditions can be achieved using: a carbonate ion or suitable salt thereof;

hydrogen peroxide, peroxide or a suitable salt thereof; and tetra acetyl ethylene diamine (TAED). Alternative alkaline bleaching conditions are: a percarbonate ion or suitable salt thereof; and tetra acetyl ethylene diamine (TAED).

Acid Bleaching (Pre-Extraction)

The alkaline bleached milled stipe portions are then optionally subjected to acid bleaching as follows. Water is added to the milled stipe portions at a ratio of 3:1 (water:milled stipe portions). The pH is then adjusted to approximately 2.2 and a bleaching compound or composition is added and is mixed with the milled stipe portions for approximately 30 minutes at approximately 25° C. After this time has elapsed, further acid is added if required to enable complete ion exchange to take place, and stirring is continued for a further 30 minutes. The milled stipe portions are then allowed to free drain, before further pressing (optionally using the pressing step as described above) to remove further water.

At this stage, the milled stipe portions appear lighter (ordinarily a very light yellow or white colour) than the starting milled stipe portions.

The pH used can be between 1 and 3, between 1.5 and 2.5, or between 1.8 and 2.3. The temperature used can be between 15° C. and 40° C., or between 25° C. and 30° C.

A large variety of different times are potentially appropriate for the acid bleaching step, which can be carried out for between 10 minutes and 120 minutes, between 15 and 120, between 20 and 120 minutes, between 20 minutes and 110 minutes, between 20 minutes and 100 minutes, between 20 minutes and 90 minutes, between 20 minutes and 80 minutes, between 20 minutes and 70 minutes, between 20 minutes and 60 minutes, between 20 minutes and 50 minutes, between 20 minutes and 40 minutes, or between 20 minutes and 30 minutes.

The acid bleaching composition comprises a bleaching agent, which comprises one or more of: a compound comprising a chlorite group, and a compound that acts as a source of a chlorite group. For example, the acid bleaching composition may comprise one or more of: chlorine dioxide, and a chlorite salt. Also, the acid bleaching composition may comprise an acid, such as a common mineral acid (e.g., hydrochloric acid, sulphuric acid, nitric acid and/or phosphoric acid).

Acid Wash/Ion Exchange

If no acid bleaching step is carried out then an acid wash/ion exchange step may be carried out to better facilitate the extraction of alginate (see below). This is carried out as follows.

Water is added to the milled stipe portions at a ratio of 3:1 (water:milled stipe portions). Acid (e.g., sulphuric acid) is then added to adjust the pH to approximately 2.2 and is mixed with the milled stipe portions for approximately 60 minutes at approximately 25° C. After this time has elapsed, further acid is added if required to enable complete ion exchange to take place, and stirring is continued for a further 30 minutes. The milled stipe portions are then allowed to free drain, before further pressing (optionally using the pressing step as described above) to remove further liquid.

The pH used can be between 1 and 3, between 1.5 and 2.5, or between 1.8 and 2.3. The temperature used can be between 15° C. and 40° C., or between 25° C. and 30° C.

A large variety of different times are potentially appropriate for the ion exchange step, which can be carried out for between 5 minutes and 40 minutes, between 10 minutes and 35 minutes, between 15 minutes and 30 minutes, between 20 minutes and 30 minutes.

Depolymerisation

An optional depolymerisation step can be carried out as follows. Water is added to the milled stipe portion in a ratio of 2:1 (water:milled stipe portions) and is added to a pressurised vessel, which is pressurised to between 0 PSI (0 kPa) and 30 PSI (208 kPa) (typically between 0 PSI (0 kPa) and 15 PSI (104 kPa)), at a temperature of between 70° C. and 130° C., for approximately 5 minutes to approximately 15 minutes. The milled stipe portions are then rinsed with water and, if necessary, pressed to remove water.

Extraction

The target chemical species (in this case alginate) is then extracted from the milled stipe portions as follows. Water is added to the milled stipe portions at a ratio of from about 2:1 to about 10:1 (optionally 3:1) (water:milled stipe portions). The pH is then adjusted to approximately 7 using sodium carbonate. This is stirred for between approximately 20 and approximately 120 minutes (optionally approximately 120 minutes) and the so-formed slurry is centrifuged to separate the solids and the liquor. The liquor is decanted from the solids. The extraction is typically carried out at a temperature of approximately 50° C.

The extraction step is typically carried out at a pH of between 6 and 11.

The extraction step also comprises converting alginic acid to sodium alginate.

The temperature for the extraction step can be between 20° C. and 60° C., or between 40° C. and 50° C.

The duration of the extraction step can be between 10 minutes and 180 minutes, between 20 minutes and 170 minutes, between 30 minutes and 160 minutes, between 40 minutes and 150 minutes, between 40 minutes and 140 minutes, between 40 minutes and 130 minutes, between 40 and 120 minutes, between 40 and 110 minutes, between 40 and 100 minutes, between 40 and 90 minutes, between 40 and 80 minutes, between 40 and 70 minutes, between 40 and 60 minutes.

Finished sodium alginate can be obtained at this stage by drying the liquor.

Neutral or Alkaline Bleaching (Post-Extraction)

A second optional neutral or alkaline bleaching can be carried out if required to remove any residual colouration from the extracted product.

The conditions used are as outlined herein under "Neutral or Alkaline Bleaching (Pre-extraction)".

Finished sodium alginate can be obtained at this stage by drying the liquor.

Precipitation

An optional precipitation can be carried out on the liquor. The liquor from the extraction (or from the post-extraction neutral or alkaline bleaching step as the case may be) is precipitated to provide as follows using two alternative routes (Direct Acid Route or Alginate Salt Route), both of which are outlined below.

Route 1 (Direct Acid Route)

As an optional first step of the direct acid route, the pH of the liquor is first adjusted to pH 7 by the addition of hydrochloric acid and/or sulphuric acid (or an alternative acid, such as hydrochloric acid).

The pH of the solution is then reduced to less than 2 using sulphuric acid, or an alternative acid, such as hydrochloric acid. The so formed alginic acid precipitate is then washed with water to remove residual free (inorganic) acid and to increase the pH to provide a solution having a pH of around pH 3 to around pH 3.5.

If desirable, the alginic acid can then be converted to sodium alginate or potassium alginate by adjusting the pH of the solution (which is a slurry of alginic acid and water) to approximately pH 5.5 to pH 8.5 (typically pH 6.5 to pH 7.5) using a base having sodium ions or potassium ions thereby causing an alginate salt to form. Other salts can be prepared as is known in the art and using suitable counter ions.

Route 2 (Alginate Salt Route)

The pH of the liquor is first adjusted to pH 7 by the addition of hydrochloric acid and/or sulphuric acid. Calcium chloride is then added using calcium chloride solution (1% to 36% weight by volume). This causes a wet calcium alginate precipitate to form.

The pH of the wet calcium alginate is then reduced (optionally after first adding water) to less than 2 using sulphuric acid, or an alternative acid, such as hydrochloric acid. The so formed alginic acid precipitate is then washed with water to remove residual free (inorganic) acid and to increase the pH to provide a solution having a pH of around pH 3 to around pH 3.5.

If desirable, the alginic acid can then be converted to sodium alginate or potassium alginate by adjusting the pH of the solution to approximately pH 5.5 to pH 8.5 (typically pH 6.5 to pH 7.5) using a base having sodium ions or potassium ions thereby causing an alginate salt to form. Other salts can be prepared as is known in the art and using suitable counter ions.

Acid Bleaching (Post-Extraction)

A second optional acid bleaching can be carried out if required to remove colouration from the extracted and precipitated product. The conditions used are as outlined herein under "Acid Bleaching (Pre-extraction)".

EXAMPLES

Below, various examples are provided of some or all of the steps above. For all the examples below, the seaweed has already been processed up to and including the "Pressing" step.

Example 1: Alkaline and Acid Bleaching Process (Sodium Percarbonate and TAED and Acid/Sodium Chlorite) after the Extraction of Alginate Only

Water Wash 500 g of milled stipe portions (equivalent to 1 kg of original milled stipe portions that had lost 50% of its weight during pressing) was placed into a 5 litre beaker. 1.5 kg of water was then added at a ratio of 3:1 (water:milled stipe portions) to make the mixture fluid. The water was around 40° C. and the mixture was stirred for approximately 30 minutes. After this time had elapsed the mixture was allowed to free drain and was then pressed to remove any remaining water.

Acid Only Wash (No Bleaching)

The purpose of this wash is to change the calcium alginate present in the seaweed into alginic acid via ion exchange.

The milled stipe portions now weighing 650 g were again added to the 5 litre beaker along with 1.95 kg of water (3:1 ratio; water:milled stipe portions) to make the mixture fluid. 140 ml of sulphuric acid (1M $H_2SO_4$) was then added to the beaker and this was stirred for 1 hour. After 1 hour had elapsed, the mixture was allowed to free drain and was then pressed to remove any remaining liquid. The milled stipe portions at this stage adopted a slightly green colour when compared to the original milled stipe portions and weighed approximately 310 g.

In order to ensure complete ion-exchange of the calcium alginate to alginic acid, a second acid wash was carried out on the milled stipe portions, with the addition of 60 ml of sulphuric acid (1M $H_2SO_4$) and 600 ml water. After stirring for 20 minutes, the material was allowed to free drain and pressed to remove excess free acid. The pressed solid was then thoroughly washed with water to a slurry pH in the range 3.1 to 3.2 and re-pressed to remove excess liquid.

Extraction

The milled stipe portions now weighing approximately 280 g were returned to a 5 litre beaker, and approximately five times the weight of the milled stipe portions in water (at 50° C.) was added to the beaker to make the mixture fluid. To the stirred beaker 100 ml to 120 ml of sodium carbonate (16% w/v) was added to raise the pH to approximately 7. The mixture was stirred for around 2 hours (more water can be added during this time if required). After 2 hours had elapsed the slurry was centrifuged to separate the solids from the liquor. The liquor was then decanted from the solids.

Once the alginate had been extracted in the form of sodium alginate the following treatments were carried out to remove colour or haze from the sodium alginate liquor, which produced a less coloured or whiter end product.

Alkaline Bleaching (Sodium Percarbonate and TAED)

A total volume of 4 litres of sodium alginate liquor was extracted from the milled stipe portions. The sodium alginate liquor was then stirred, and to the stirring liquor 2.5 g of sodium percarbonate was added and allowed to dissolve to increase the pH to approximately 10.3. At this point 1 g of TAED was added. This was stirred for approximately 30 minutes. After the treatment the colour of the sodium alginate liquor changed from a brown/dark yellow colour to a light yellow/green/clear colour.

Precipitation

The alginate was then precipitated as follows, using a mixture of hydrochloric acid and calcium chloride. 200 ml of a hydrochloric acid/calcium chloride mixture (1:1; 1M hydrochloric acid:4% v/v calcium chloride) was used to precipitate the 4 litre volume of sodium alginate (creating a mixture of calcium alginate and alginic acid). The so-formed mixture of calcium alginate and alginic acid was then washed and drained until the pH was approximately 3 and the run off liquid was clear. The mixture was then macerated and washed and drained again until the run off liquid was clear

Acid Bleaching (Hydrochloric Acid and Sodium Chlorite Wash)

This was the final decolouration stage in the process and was carried out on solid alginic acid. At this point the calcium alginate and the alginic acid mixture were changed into alginic acid only.

140 ml hydrochloric acid (1M) was added to the alginate mixture in order convert it all to alginic acid. At this point 1 ml of sodium chlorite (25% w/v) was also added to bleach the alginic acid. This was left to sit for 1 hour. After this time had elapsed, the alginic acid was drained and then washed/drained until the pH was approximately 3 to 3.5. At this point the alginic acid was a white colour but in some instances, might be clear.

The alginic acid was then changed to sodium alginate as described above, and then dried.

Comments on Results

The sodium alginate product was white in colour, but the colour did revert to pale yellow on solubilisation of sodium alginate. Also, the sodium alginate liquor formed was hazy.

Example 2: Alkaline and Acid Bleaching Process (Sodium Percarbonate/TAED and Acid/Sodium Chlorite) Before and After Extraction of Alginate

Water Wash 500 g of milled stipe portions (equivalent to 1 kg of original milled stipe portions that had lost 50% of its weight during pressing) was placed into a 5 litre beaker. 1.5 kg of water was then added at a ratio of 3:1 (water:milled stipe portions) to make the mixture fluid. The water was around 40° C. and the mixture was stirred for approximately 30 minutes. After this time had elapsed the mixture was allowed to free drain and was then pressed to remove any remaining water.

Alkaline Bleaching (Sodium Percarbonate and TAED)

The milled stipe portions now weighing 650 g were again added to a 5 litre beaker along with 1.95 kg of water (3:1 ratio; water:milled stipe portions) to make the mixture fluid. 10 g of sodium percarbonate was then added to the vessel to allow the pH to rise to around pH 10.3. At this point 4 g of TAED was added to the vessel and this was mixed for approximately 20 minutes. After this time had elapsed the mixture was allowed to free drain was then pressed to remove any remaining water. At this point, there was a colour change is the milled stipe portions; the colour of the milled stipe portions had become lighter (a light yellow colour) than the starting colour.

Acid Bleaching (Hydrochloric Acid and Sodium Chlorite Wash)

The milled stipe portions now weigh 682.5 g (a 5% increase in weight) and were returned to the 5 litre plastic beaker, before 2 kg of water was added (3:1 ratio; water:milled stipe portions) allowing the mixture to become fluid. 100 ml of hydrochloric acid (1M HCl) was then added to the beaker to lower the pH of the mixture to around pH 2.2. 8 ml of sodium chlorite (25% w/v) was then added to the beaker. This mixture was stirred for approximately 30 minutes to allow bleaching of the mixture to take place. After 30 minutes, a further 80 ml of hydrochloric acid (1M HCl) was added to the beaker for complete ion exchange to occur in the milled stipe portions. This was then allowed to continue stirring for a further 30 minutes. After a total of 1 hour had elapsed the mixture was allowed to free drain, thoroughly washed with water to a slurry of pH 3.1 to 3.2, and was then pressed to remove excess liquid.

There was a noticeable difference in the colour of the mixture. It was a very light yellow or white colour when compared to the original milled stipe portions.

Extraction

The milled stipe portions now weighing approximately 280 g were returned to a 5 litre beaker, and approximately five times the weight of the milled stipe portions in water (at 50° C.) was added to the beaker to make the mixture fluid. To the stirring beaker 100 ml to 120 ml of sodium carbonate (16% w/v) was added to raise the pH to approximately 7. The mixture was stirred for around 2 hours (more water can be added during this time if required). After 2 hours had elapsed the slurry was centrifuged to separate the solids from the liquor. The liquor was then decanted from the solids.

Alkaline Bleaching (Sodium Percarbonate/TAED)

Just over 5 litres of sodium alginate liquor were extracted from the milled stipe portions. The sodium alginate liquor was then stirred, and to the stirring liquor 2.5 g of sodium percarbonate was added and allowed to dissolve to increase the pH to approximately 10.3. At this point 1 g of TAED was added. This was stirred for a period of time that can range between 10 minutes to several hours, typically 20 minutes, depending on the level of bleaching required.

After the required treatment time the colour of the sodium alginate liquor had changed from a brown/dark yellow colour to a light yellow/green/clear colour.

Precipitation

The alginate was precipitated as follows using a mixture of hydrochloric acid and calcium chloride (1:1; 1M hydrochloric acid:4% v/v calcium chloride). 200 ml of this mixture was used to precipitate a 5 litre volume of sodium alginate (creating a mixture of calcium alginate and alginic acid). The mixture of calcium alginate and alginic acid was then washed and drained until the pH was approximately 3 and the run off liquid was clear. The mixture was then macerated and washed and drained again until the run off liquid was clear.

Acid Bleaching (Hydrochloric Acid and Sodium Chlorite Wash)

This was the final decolouration stage in the process and was carried out on solid alginic acid. At this point the calcium alginate and the alginic acid mixture were changed into alginic acid only.

140 ml of hydrochloric acid (1M) was added to the alginate mixture in order convert it all to alginic acid. At this point 1 ml of sodium chlorite (25% w/v) was also added to bleach the alginic acid. This was left to sit for 1 hour. After this time has elapsed the alginic acid is then drained and washed/drained until the pH is approximately 3 to 3.5. At this point the alginic acid was white to colourless.

The alginic acid was then changed to sodium alginate as described above, and then dried.

Comments on Results

The alginate extracted from the seaweed was a light yellow colour. The residual seaweed also stayed a light yellow colour. After alkaline bleaching and precipitation a white alginate was obtained. This then underwent an acid/chlorite bleach (although it was perhaps not required given that the alginate at this stage was already white), but there was no further change in the colour of the alginic acid. Once converted into sodium alginate liquor, this was clear and there was no colour reversion.

Example 3: Alkaline Beaching (Sodium Percarbonate/TAED) (with Ion Exchange) Before Extraction of Alginate Only Water Wash 500 g of milled stipe portions (equivalent to 1 kg of original milled stipe portions that had lost 50% of its weight during pressing) was placed into a 5 litre beaker. 1.5 kg of water was then added at a ratio of 3:1 (water:milled stipe portions) to make the mixture fluid. The water was around 40° C. and the mixture was stirred for approximately 30 minutes. After this time had elapsed the mixture was allowed to free drain and was then pressed to remove any remaining water.

Alkaline Bleaching (Sodium Percarbonate and TAED)

The milled stipe portions now weighing 650 g were again added to the 5 litre beaker along with 1.95 kg of water (3:1 ratio; water:milled stipe portions) to make the mixture fluid. 10 g of sodium percarbonate was then added to the vessel to allow the pH to rise to around pH 10.3. At this point 4 g of TAED was also added to the vessel. This was then mixed for approximately 20 minutes. After this time had elapsed the mixture was allowed to free drain and was then pressed to remove any remaining water. At this point, the colour of the milled stipe portions had become lighter (a light yellow colour) than the starting colour.

Acid Only Wash (No Bleaching)

The purpose of this wash was to change the calcium alginate present in the seaweed into alginic acid via ion exchange.

The milled stipe portions now weighing 682.5 g were again added to a 5 litre beaker along with 2 kg of water (3:1 ratio; water:milled stipe portions) to make the mixture fluid. 140 ml of sulphuric acid (1M $H_2SO_4$) was then added to the beaker and this was stirred for 1 hour. After 1 hour had elapsed, the mixture was allowed to free drain and was then pressed to remove any remaining liquid. The milled stipe portions at this stage adopted a slightly green colour when compared to the original milled stipe portions and weighed approximately 330 g.

In order to ensure complete ion-exchange of the calcium alginate to alginic acid, a second acid wash was carried out on the milled stipe portions, with the addition of 60 ml of sulphuric acid (1M $H_2SO_4$) and 600 ml water. After stirring for 20 minutes, the material was allowed to free drain and pressed to remove excess free acid. The pressed solid was then thoroughly washed with water to a slurry pH in the range 3.1 to 3.2 and re-pressed to remove excess liquid.

Extraction

The milled stipe portions now weighing approximately 280 g were returned to a 5 litre beaker, and approximately five times the weight of the milled stipe portions in water (at 50° C.) was added to the beaker to make the mixture fluid. To the stirring beaker 100 ml to 120 ml of sodium carbonate (16% w/v) was added to raise the pH to approximately 7. The mixture was stirred for around 2 hours (more water can be added during this time if required). After 2 hours had elapsed, the slurry was centrifuged to separate the solids from the liquor. The liquor was then decanted from the solids.

Precipitation

The alginate was then precipitated using calcium chloride (4% v/v) as follows. 140 ml of the calcium chloride was used to precipitate the 4 litre volume of sodium alginate into calcium alginate. The calcium alginate was then washed and drained until the run off liquid was clear. The mixture was then macerated and washed and drained again until the run off liquid was clear. At this point the calcium alginate was then changed into alginic acid using 200 ml of 1M HCl. The alginic acid was then washed and drained until the pH was around 3 to 3.5 and the run-off water was clear.

The alginic acid was then changed to sodium alginate as described above, and then dried.

Comments on Results

After alkaline bleaching was carried out the milled stipe portions underwent an acid wash to ion exchange. Interestingly, the milled stipe portions did not go a green colour. The slurry during extraction did not change colour or darken, producing a light yellow liquor and milled stipe residue. Colour was also removed during precipitation to give a white alginate that produces a clear sodium alginate liquor with very little colour reversion.

Example 4: Alkaline Bleaching (Sodium Percarbonate/TAED) (with Ion Exchange) after Extraction of Alginate Only Water Wash 500 g of milled stipe portions (equivalent to 1 kg of original milled stipe portions that had lost 50% of its weight during pressing) was placed into a 5 litre beaker. 1.5 kg of water was then added at a ratio of 3:1 (water:milled stipe portions) to make the mixture fluid. The water was around 40° C. and the mixture was stirred for approximately 30 minutes. After this time had elapsed the mixture was allowed to free drain and was then pressed to remove any remaining water.

Acid Only Wash (No Bleaching)

The purpose of this wash was to change the calcium alginate present in the seaweed into alginic acid via ion exchange.

The milled stipe portions now weighing 650 g were again added to the 5 litre beaker along with 1.95 kg of water (3:1 ratio; water:milled stipe portions) to make the mixture fluid.

140 ml of sulphuric acid (1M $H_2SO_4$) was then added to the beaker and this was stirred for 1 hour. After 1 hour had elapsed, the mixture was allowed to free drain and was then pressed to remove any remaining liquid. The milled stipe portions at this stage adopted a slightly green colour when compared to the original milled stipe portions and weighed approximately 320 g.

In order to ensure complete ion-exchange of the calcium alginate to alginic acid, a second acid wash was carried out on the milled stipe portions, with the addition of 60 ml of sulphuric acid (1M $H_2SO_4$) and 600 ml water. After stirring for 20 minutes, the material was allowed to free drain and pressed to remove excess free acid. The pressed solid was then thoroughly washed with water to a slurry pH in the range 3.1 to 3.2 and re-pressed to remove excess liquid.

Extraction

The milled stipe portions now weighing approximately 280 g were returned to a 5 litre beaker, and approximately five times the weight of the milled stipe portions in water (at 50° C.) was added to the beaker to make the mixture fluid. To the stirring beaker 100 ml to 120 ml of sodium carbonate (16% w/v) was added to raise the pH to approximately 7. The mixture was stirred for around 2 hours (more water can be added during this time if required). After 2 hours had elapsed, the slurry was centrifuged to separate the solids from the liquor. The liquor was then decanted from the solids.

Alkaline Bleaching (Sodium Percarbonate/TAED)

Just over 4 litres of sodium alginate liquor was extracted from the milled stipe portions. The sodium alginate liquor was then stirred, and to the stirring liquor 3 g of sodium percarbonate was added and allowed to dissolve to increase the pH to approximately 10.3. At this point 1.5 g of TAED was also added. This was stirred for a period of time that can range between 20 minutes to several hours, depending on the level of bleaching required. On this occasion, it was stirred for 1.5 hours. After the required treatment time the colour of the sodium alginate liquor changed from a brown/dark yellow colour to a light yellow/green/clear colour.

Precipitation

The alginate was then precipitated as follows using calcium chloride (4% v/v). 140 ml of this mixture was used to precipitate the 4 litre volume of sodium alginate into calcium alginate. The calcium alginate was then washed and drained until the run off liquid was clear. The mixture was then macerated and washed and drained again until the run off liquid was clear. At this point the calcium alginate was changed into alginic acid using 200 ml of 1M HCl. The alginic acid was then washed and drained until the pH was around 3 to 3.5 and the run-off water was clear.

The alginic acid was then changed to sodium alginate as described above, and then dried.

Comments on Results

Before the milled stipe portions underwent alginate extraction they were given an acid only wash to ion exchange (to remove calcium). This left the milled stipe portions light green in colour. During extraction, the slurry darkened in colour to give a dark yellow/brown liquor and residue. After centrifugation, the alginate liquor had an alkaline bleach, and after this the colour lightened to give a lighter yellow colour liquor. This was then precipitated, which again removed colour from the alginate to produce a light yellow/green colour alginate. Once converted into sodium alginate liquor, the colour was slightly yellow.

Example 5: Alkaline Bleaching (Sodium Percarbonate/TAED) (with Ion Exchange) Before and After Alginate Extraction Water Wash 500 g of milled stipe portions (equivalent to 1 kg of original milled stipe portions that had lost 50% of its weight during pressing) was placed into a 5 litre beaker. 1.5 kg of water was then added at a ratio of 3:1 (water:milled stipe portions) to make the mixture fluid. The water was around 40° C. and the mixture was stirred for approximately 30 minutes. After this time had elapsed the mixture was allowed to free drain and was then pressed to remove any remaining water.

Alkaline Bleaching (Sodium Percarbonate and TAED)

The milled stipe portions now weighing 650 g were again added to a 5 litre beaker along with 1.95 kg of water (3:1 ratio; water:milled stipe portions) to make the mixture fluid. 10 g of sodium percarbonate was then added to the vessel to allow the pH to rise to around pH 10.3. At this point 4 g of TAED was then also added to the vessel. This was mixed for approximately 20 minutes. After this time had elapsed, the mixture was allowed to free drain and was then pressed to remove any remaining water. At this point, the colour of the milled stipe portions became lighter (a light yellow colour) than the starting colour.

Acid Only Wash (No Bleaching)

The purpose of this wash was to change the calcium alginate present in the seaweed into alginic acid via ion exchange.

The milled stipe portions now weighing 682.5 g were again added to a 5 litre beaker along with 2 kg of water (3:1 ratio; water:milled stipe portions) to make the mixture fluid. 140 ml of sulphuric acid (1M $H_2SO_4$) was then added to the beaker and this was stirred for 1 hour. After 1 hour had elapsed, the mixture was allowed to free drain and was then pressed to remove any remaining liquid. The milled stipe portions at this stage adopted a slightly green colour when compared to the original milled stipe portions and weighed approximately 315 g.

In order to ensure complete ion-exchange of the calcium alginate to alginic acid, a second acid wash was carried out on the milled stipe portions, with the addition of 60 ml of sulphuric acid (1M $H_2SO_4$) and 600 ml water. After stirring for 20 minutes, the material was allowed to free drain and pressed to remove excess free acid. The pressed solid was then thoroughly washed with water to a slurry pH in the range 3.1 to 3.2 and re-pressed to remove excess liquid.

Extraction

The milled stipe portions now weighing approximately 280 g were returned to a 5 litre beaker, and approximately five times the weight of the milled stipe portions in water (at 50° C.) was added to the beaker to make the mixture fluid.

To the stirring beaker 100 ml to 120 ml of sodium carbonate (16% w/v) was added to raise the pH approximately 7. The mixture was stirred for around 2 hours (more water can be added during this time if required). After 2 hours had elapsed, the slurry was centrifuged to separate the solids from the liquor. The liquor was then decanted from the solids.

Alkaline Bleaching (Sodium Percarbonate/TAED)

Just over 4 litres of sodium alginate liquor was extracted from the milled stipe portions. The sodium alginate liquor was then stirred, and to the stirring liquor 3 g of sodium percarbonate was added and allowed to dissolve to increase the pH to approximately 10.3. At this point 1.5 g of TAED was also added. This was stirred for a period of time that can range between 20 minutes to several hours, depending on the level of bleaching required. On this occasion, it was stirred for 1.5 hours. After the required treatment time the colour of the sodium alginate liquor had changed from a brown/dark yellow colour to a light yellow/green/clear colour.

Precipitation

The alginate was then precipitated using calcium chloride (4% v/v) as follows. 160 ml of this mixture was used to precipitate the 4 litre volume of sodium alginate into calcium alginate. The calcium alginate was then washed and drained the run off liquid was clear. The mixture was then macerated and washed and drained again until the run off liquid was clear. At this point the calcium alginate was then changed into alginic acid using 200 ml of 1M HCl. The alginic acid was then washed and drained until the pH was around 3 to 3.5 and the run-off water was clear.

The alginic acid was then changed to sodium alginate as described above, and then dried.

Comments on Results

Before extraction of the alginate the milled stipe portions underwent the same process as in Experiment 3 above, leaving a yellow milled stipe residue and alginate liquor. After centrifugation, the alginate liquor was given a further alkaline bleach, changing the colour from a yellow/brown to a light yellow/green colour. It was then precipitated, which removed most of the colour producing a white alginate. When converted to sodium alginate it gave an almost colourless alginate liquor.

Example 6: Acid Bleaching Process (Acid/Sodium Chlorite) Before Extraction of Alginate Only Water Wash 500 g of milled stipe portions (equivalent to 1 kg of original milled stipe portions that had lost 50% of its weight during pressing) was placed into a 5 litre beaker. 1.5 kg of water was then added at a ratio of 3:1 (water:milled stipe portions) to make the mixture fluid. The water was around 40° C. and the mixture was stirred for approximately 30 minutes. After this time had elapsed, the mixture was allowed to free drain and was then pressed to remove any remaining water.

Acid Bleaching (Hydrochloric Acid and Sodium Chlorite Wash)

The milled stipe portions now weigh 650 g and they were returned to the 5 litre plastic beaker, before 1.95 kg of water was added (3:1 ratio; water:milled stipe portions) allowing the mixture to become fluid. 100 ml of hydrochloric acid (1M HCl) was then added to the beaker to lower the pH of the mixture to around pH 2.2. 8 ml of sodium chlorite (25% w/v) was then added to the beaker. This was stirred for approximately 30 minutes to allow bleaching of the mixture to take place. After 30 minutes, a further 40 ml of hydrochloric acid (1M HCl) was added to the beaker for complete ion exchange to occur in the milled stipe portions. This was then allowed to continue stirring for a further 30 minutes. After 1 hour had elapsed, the mixture was allowed to free drain, thoroughly washed with water to a slurry of pH 3.1 to 3.2, and was then pressed to remove excess liquid. There was a noticeable difference in the colour of the mixture, it being a very light yellow or white colour when compared to the original milled stipe portions.

Extraction

The milled stipe portions now weighing approximately 280 g were returned to a 5 litre beaker, and approximately five times the weight of the milled stipe portions in water (at 50° C.) was added to the beaker to make the mixture fluid. To the stirring beaker 100 ml to 120 ml of sodium carbonate (16% w/v) was added to raise the pH to approximately 7. The mixture was stirred for around 2 hours (more water can be added during this time if required). After 2 hours had elapsed, the slurry was centrifuged to separate the solids from the liquor. The liquor was then decanted from the solids.

Precipitation

The alginate was then precipitated using calcium chloride (4% v/v) as follows. 160 ml of this mixture was used to precipitate the 4 litre volume of sodium alginate into calcium alginate. The calcium alginate was then washed and drained the run off liquid was clear. The mixture was then macerated and washed and drained again until the run off liquid was clear. At this point the calcium alginate was then changed into alginic acid using 200 ml of 1M HCl. The alginic acid was then washed and drained until the pH was around 3 to 3.5 and the run-off water was clear.

The alginic acid was then changed to sodium alginate as described above, and then dried.

Comments on Results

After the initial water wash of the milled stipe portions it was given an acid/chlorite bleaching. This both ion exchanges and bleaches the milled stipe portions, the resultant milled stipe portions being considerably lighter than the starting material (although not as light as the milled stipe portions that have had both the alkaline bleaching and acid/chlorite bleaching). Upon extraction of the alginate, the slurry darkened in colour resulting in a brown liquor and dark yellow residue. This liquor was then precipitated and again some of the colour was removed but the resultant alginate was still a light yellow colour. When the alginate was converted into sodium alginate it darkened slightly again giving a light brown coloured liquor.

Example 7: Acid Bleaching Process (Acid/Sodium Chlorite) After Extraction of Alginate Only Water Wash 500 g of milled stipe portions (equivalent to 1 kg of original milled stipe portions that had lost 50% of its weight during pressing) was placed into a 5 litre beaker. 1.5 kg of water was then added at a ratio of 3:1 (water:milled stipe portions) to make the mixture fluid. The water was around 40° C. and the mixture was stirred for approximately 30 minutes. After this time had elapsed the mixture was allowed to free drain and was then pressed to remove any remaining water.

Acid Only Wash (No Bleaching)

The purpose of this wash was to change the calcium alginate present in the seaweed into alginic acid via ion exchange.

The milled stipe portions now weighing 650 g were again added to a 5 litre beaker along with 1.95 kg of water (3:1 ratio; water:milled stipe portions) to make the mixture fluid. 140 ml of sulphuric acid (1M $H_2SO_4$) was then added to the beaker and this was stirred for 1 hour. After 1 hour had elapsed the mixture was allowed to free drain and was then pressed to remove any remaining liquid. The milled stipe portions at this stage adopted a slightly green colour when compared to the original milled stipe portions and weighed approximately 325 g.

In order to ensure complete ion-exchange of the calcium alginate to alginic acid, a second acid wash was carried out on the milled stipe portions, with the addition of 60 ml of sulphuric acid (1M $H_2SO_4$) and 600 ml water. After stirring for 20 minutes, the material was allowed to free drain and pressed to remove excess free acid. The pressed solid was then thoroughly washed with water to a slurry pH in the range 3.1 to 3.2 and re-pressed to remove excess liquid.

Extraction

The milled stipe portions now weighing approximately 280 g were returned to a 5 litre beaker, and approximately five times the weight of the milled stipe portions in water (at 50° C.) was added to the beaker to make the mixture fluid. To the stirring beaker 100 ml to 120 ml of sodium carbonate (16% w/v) was added to raise the pH to around pH 7. The mixture was stirred for around 2 hours (if more water is needed to be added during this time then more is added as required). After 2 hours had elapsed, the slurry was centrifuged to separate the solids from the liquor. The liquor was then decanted from the solids.

Precipitation

The alginate was then precipitated using calcium chloride (4% v/v) as follows. 200 ml of this mixture was used to precipitate the 4 litre volume of sodium alginate into calcium alginate. The calcium alginate was then washed and drained the run off liquid was clear. The mixture was then macerated and washed and drained again until the run off liquid was clear.

Acid Bleaching (Hydrochloric Acid and Sodium Chlorite Wash)

This was the final decolouration stage in the process and was carried out on solid alginic acid. At this point the calcium alginate and the alginic acid mixture are changed into alginic acid only.

100 ml hydrochloric acid (1M) was added to the alginate mixture in order convert it all to alginic acid. At this point 4 ml of sodium chlorite (25% w/v) was also added to bleach the alginic acid. This was left to sit for 1 hour. After this time had elapsed, the alginic acid was drained and washed/drained until the pH was approximately 3 to 3.5. At this point the alginic acid was white to colourless.

The alginic acid was then changed to sodium alginate as described above, and then dried.

Comments on Results

The milled stipe portions underwent an acid only wash to ion exchange before extraction, which provided a green coloured mixture. During the extraction, the slurry darkened giving a brown residue and liquor. This liquor was the precipitated removing some of the colour but leaving a yellow coloured alginate. This alginate then underwent an acid/chlorite bleach, and the resultant alginate was white. Once the alginate was converted into sodium alginate, there was a slight colour reversion in the alginate resulting in a light brown coloured liquor.

Example 8: Acid Bleaching Process (Acid/Sodium Chlorite) Before and After Extraction of Alginate Only Water Wash 500 g of milled stipe portions (equivalent to 1 kg of original milled stipe portions that had lost 50% of its weight during pressing) was placed into a 5 litre beaker. 1.5 kg of water was then added at a ratio of 3:1 (water:milled stipe portions) to make the mixture fluid. The water was around 40° C. and the mixture was stirred for approximately 30 minutes. After this time had elapsed the mixture was allowed to free drain and was then pressed to remove any remaining water.

Acid Bleaching (Hydrochloric Acid and Sodium Chlorite Wash)

The milled stipe portions now weigh 650 g and they were returned to a 5 litre plastic beaker, before 1.95 kg of water was added (3:1 ratio; water:milled stipe portions) allowing the mixture to become fluid. 100 ml of hydrochloric acid (1M HCl) was then added to the beaker to lower the pH of the mixture to go to around pH 2.2. 8 ml of sodium chlorite (25% w/v) was then added to the beaker. This was stirred for approximately 30 minutes to allow bleaching of the mixture to take place. After 30 minutes, a further 80 ml of hydrochloric acid (1M HCl) was added to the beaker for complete ion exchange to occur in the milled stipe portions. This was then allowed to continue stirring for a further 30 minutes. After 1 hour had elapsed, the mixture was allowed to free drain, thoroughly washed with water to a slurry pH of 3.1 to 3.2, and was then pressed to remove excess water. There was a noticeable difference in the colour of the mixture; it was a very light yellow or white colour when compared to the original milled stipe portions.

Extraction

The milled stipe portions now weighing approximately 280 g were returned to a 5 litre beaker, and approximately five times the weight of the milled stipe portions in water (at 50° C.) was added to the beaker to make the mixture fluid. To the stirring beaker 100 ml to 120 ml of sodium carbonate (16% w/v) was added to raise the pH to approximately 7. The mixture was stirred for around 2 hours (if more water is needed to be added during this time then more is added as required). After 2 hours had elapsed, the slurry was centrifuged to separate the solids from the liquor. The liquor was then decanted from the solids.

Precipitation

The alginate was then precipitated using calcium chloride (4% v/v) as follows. 400 ml of this mixture was used to precipitate the 4 litre volume of sodium alginate into calcium alginate. The calcium alginate was then washed and drained the run off liquid was clear. The mixture was then macerated and washed and drained again until the run off liquid was clear.

Acid Bleaching (Hydrochloric Acid and Sodium Chlorite Wash)

This was the final decolouration stage in the process and was carried out on solid alginic acid. At this point the calcium alginate and the alginic acid mixture are changed into alginic acid only.

200 ml hydrochloric acid (1M) was added to the alginate mixture in order convert it all to alginic acid. At this point 2 ml of sodium chlorite (25% w/v) was also added to bleach the alginic acid. This was left to sit for 1 hour. After this time had elapsed, the alginic acid was drained and washed/drained until the pH was approximately 3 to 3.5. At this point the alginic acid was colourless/white.

The alginic acid was then changed to sodium alginate as described above, and then dried.

Comments on Results

Before extraction of the alginate the milled stipe portions underwent the same process as in Experiment 6, giving a light milled stipe portion colour for extraction. During extraction, the slurry darkened slightly giving a yellow residue and a brown alginate liquor. This liquor was then precipitated removing some of the colour, but leaving a yellow coloured alginate. This alginate then underwent an acid/chlorite bleach, and the resultant alginate was white. Once the alginate was converted into sodium alginate, there was a slight colour reversion in the alginate resulting in a light brown coloured liquor.

Example 9: Alkaline Bleaching (Sodium Percarbonate/TAED) (No Ion Exchange) Before Alginate Extraction Only Water Wash 500 g of milled stipe portions (equivalent to 1 kg of original milled stipe portions that had lost 50% of its weight during pressing) was placed into a 5 litre beaker. 1.5 kg of water was then added at a ratio of 3:1 (water:milled stipe portions) to make the mixture fluid. The water was around 40° C. and the mixture was stirred for approximately 30 minutes. After this time had elapsed the mixture was allowed to free drain and was then pressed to remove any remaining water.

Alkaline Bleaching (Sodium Percarbonate and TAED)

The milled stipe portions now weighing 650 g were again added to a 5 litre beaker along with 1.95 kg of water (3:1 ratio; water:milled stipe portions) to make the mixture fluid. 10 g of sodium percarbonate was then added to the vessel to allow the pH to rise to around pH 10.3. At this point 4 g of TAED was also added to the vessel. This is then mixed for approximately 20 minutes. After this time had elapsed, the mixture was allowed to free drain and was then pressed to remove any remaining water. At this point, the colour of the seaweed became lighter (a light yellow colour) than the starting colour of the milled stipe portions.

Extraction

The milled stipe portions now weighing approximately 682.5 g were returned to a 5 litre beaker, and approximately five times the weight of the milled stipe portions in water (at 50° C.) was added to the beaker to make the mixture fluid. To the stirring beaker 300 ml of sodium carbonate (16% w/v) was added to raise the pH to approximately 11. The mixture was stirred for around 2 hours (more water can be added during this time if required). After 2 hours had elapsed, the slurry was centrifuged to separate the solids from the liquor. The liquor was then decanted from the solids.

Precipitation

The alginate was then precipitated using calcium chloride (4% v/v) as follows. 800 ml of this mixture was used to precipitate the 7 litre volume of sodium alginate into calcium alginate. The calcium alginate was then washed and drained the run off liquid was clear. The mixture was then macerated and washed and drained again until the run off liquid was again clear. At this point the calcium alginate was then changed into alginic acid using 960 ml of 1M HCl. The alginic acid was then washed and drained until the pH was around 3 to 3.5 and the run-off water was clear.

The alginic acid was then changed to sodium alginate as described above, and then dried.

In this example, the alginic acid was changed into sodium alginate using 40 ml of sodium carbonate (16% w/v). Once the mixture had totally dissolved into solution it was obvious that there was still calcium present within the sodium alginate liquor as it was behaving more like a gel than a fluid. To remove this excess calcium, the liquor was re-precipitated using 300 ml of 1M HCl. Once re-precipitated, the alginic acid was then washed and drained until the liquid running off was clear and the pH had reached 3.3 to 5. The alginic acid was then re-solubilised using 40 ml of sodium carbonate (16% w/v). The sodium alginate was then dried and milled.

Comments on Results

The only main difference between this experiment and Experiment 3 was that no ion exchange was carried out before extraction. During the extraction, the colour of the slurry did not change at all. It remained a light yellow colour, and the resultant liquor that was separated from the solids was a yellow/white colour and was very hazy. Precipitation removed most of this colour giving a white alginate. A large amount of acid was needed to remove the calcium from the alginate, and had to be re-precipitated to alginic acid several times with several washes for lengthy periods to remove the calcium. Once the alginate was converted into solubilised sodium alginate the result was a light coloured liquor.

Example 10: Alkaline Bleaching (Sodium Percarbonate/TAED) (No Ion Exchange) After Alginate Extraction Only

Water Wash 500 g of milled stipe portions (equivalent to 1 kg of original milled stipe portions that had lost 50% of its weight during pressing) was placed into a 5 litre beaker. 1.5 kg of water was then added at a ratio of 3:1 (water:milled stipe portions) to make the mixture fluid. The water was around 40° C. and the mixture was stirred for approximately 30 minutes. After this time had elapsed the mixture was allowed to free drain and was then pressed to remove any remaining water.

Extraction

The milled stipe portions now weighing approximately 650 g were returned to a 5 litre beaker, and approximately five times the weight of the milled stipe portions in water (at 50° C.) was added to the beaker to make the mixture fluid. To the stirring beaker, 300 ml of sodium carbonate (16% w/v) was added to raise the pH to approximately 11. The mixture was stirred for around 2 hours (more water can be added during this time if required). After 2 hours had elapsed, the slurry was centrifuged to separate the solids from the liquor. The liquor was then decanted from the solids.

Alkaline Bleaching (Sodium Percarbonate/TAED)

The 7 litres of sodium alginate was then stirred, and to the stirring liquor 6 g of sodium percarbonate was added and allowed to dissolve to increase the pH to approximately 10.3. 3 g of TAED was then added. It was noted that the pH rose to around 11. The mixture was stirred for a period of time that can range between 30 minutes to several hours, depending on the level of bleaching required. After the required treatment time the colour of the sodium alginate liquor changed from a brown/dark yellow colour to a light yellow/green/clear colour.

Precipitation

The alginate was split into two equal volumes (batches) then precipitated by two different methods as follows:

Precipitation Method 1—Calcium Chloride

Precipitation was carried out using calcium chloride (4% v/v). 500 ml of this mixture was used to convert the sodium alginate liquor into precipitated calcium alginate. The calcium alginate was then washed and drained until the run off liquid was clear. The mixture was then macerated and washed and drained again until the run off liquid was again clear. At this point, the calcium alginate was then changed into alginic acid using 300 ml of 1M HCl. The alginic acid was then washed and drained until the pH was around 3 to 3.5 and the run-off water was clear.

Precipitation Method 2—Hydrochloric Acid

Precipitation was carried out using 1M hydrochloric acid. 1000 ml of the 1M HCl was used to convert the sodium alginate into precipitated alginic acid. The alginic acid was then washed and drained until the run off liquid was clear and the pH of the liquid was around 3 to 3.5.

The alginic acid was then returned to sodium alginate using sodium carbonate (16% w/v). Once the mixture had totally dissolved into solution, it was obvious that there was still calcium present within the sodium alginate liquor as it was behaving more like a gel than a fluid. To remove this excess calcium, the liquor was re-precipitated using 200 ml of 1M HCl. Once re-precipitated, the alginic acid was then washed and drained until the liquid running off was clear and the pH had reached 3 to 3.5. The alginic acid was then re-solubilised using sodium carbonate (16% w/v). The sodium alginate was then dried and milled.

Comments on Results

The main difference between this experiment and Experiment 4 was that no ion exchange was carried out before extraction. The colour of the slurry during the extraction quickly darkened once the pH rose above 7. This resulted in a very brown residue and liquor. Precipitation removed most of this colour giving a white alginate. Once the alginate was converted into sodium alginate liquor it was hazy and was a light brown/tan colour.

Example 11: Alkaline Bleaching (Sodium Percarbonate/TAED) (No Ion Exchange) Before and After Alginate Extraction

Water Wash 500 g of milled stipe portions (equivalent to 1 kg of original milled stipe portions that had lost 50% of its weight during pressing) was placed into a 5 litre beaker. 1.5 kg of water was then added at a ratio of 3:1 (water:milled stipe portions) to make the mixture fluid. The water was around 40° C. and the mixture was stirred for approximately 30 minutes. After this time had elapsed, the mixture was allowed to free drain and was then pressed to remove any remaining water.

Alkaline Bleaching (Sodium Percarbonate and TAED)

The milled stipe portions now weighing 650 g were again added to a 5 litre beaker along with 1.95 kg of water (3:1 ratio; water:milled stipe portions) to make the mixture fluid. 10 g of sodium percarbonate was then added to the vessel to allow the pH to rise to around pH 10.3. At this point 4 g of TAED was then also added to the vessel. This was then mixed for approximately 20 minutes. After this time had elapsed, the mixture was allowed to free drain and was then pressed to remove any remaining water. At this point, the colour of the seaweed became lighter (a light yellow colour) than the starting colour of the seaweed.

Extraction

The milled stipe portions now weighing approximately 682.5 g were returned to a 5 litre beaker, and approximately five times the weight of the milled stipe portions in water (at 50° C.) was added to the beaker to make the mixture fluid. To the stirring beaker 300 ml of sodium carbonate (16% w/v) was added to raise the pH to approximately 11. The mixture was stirred for around 2 hours (more water can be added during this time if required). After 2 hours had elapsed, the slurry was centrifuged to separate the solids from the liquor. The liquor was then decanted from the solids.

Alkaline Bleaching (Sodium Percarbonate/TAED)

Just under 8 litres of sodium alginate liquor was extracted from the milled stipe portions. The sodium alginate liquor was then stirred, to the stirring liquor 4 g of sodium percarbonate was added and allowed to dissolve to increase the pH to approximately 10.3. At this point 1.6 g of TAED was added. This was stirred for a period of time that can range between 30 minutes to several hours, depending on the level of bleaching required. After the required treatment time, there was no colour change in the sodium alginate liquor; it remained nearly colourless but was cloudy.

Precipitation

The alginate was precipitated as follows using calcium chloride (9% v/v). 400 ml of this mixture was used to precipitate the 8 litre volume of sodium alginate into calcium alginate. The calcium alginate was then washed and drained until the run off liquid was clear. The mixture was then macerated and washed and drained again until the run off liquid was clear. At this point the calcium alginate was changed into alginic acid using 380 ml of 1M HCl. The alginic acid was then washed and drained until the pH was around 3 to 3.5 and the run-off water was clear.

The alginic acid was returned to sodium alginate using sodium carbonate (16% w/v). Once the mixture had totally dissolved into solution it was obvious that there was still calcium present within the sodium alginate liquor as it behaved more like a gel than a fluid. To remove this excess calcium, the liquor was re-precipitated using 200 ml of 1M HCl. Once re-precipitated, the alginic acid was then washed and drained until the liquid running off was clear and the pH had reached 3 to 3.5. The alginic acid was then re-solubilised using sodium carbonate (16% w/v). The sodium alginate was then dried and milled.

Comments on Results

The main difference between this experiment and Experiment 5 was that no ion exchange was carried out before extraction. The milled stipe portions before extraction were a light yellow colour. During the extraction, the colour of the slurry did not change at all; it remained a light yellow colour. The resultant liquor as separated from the residue was a yellow/white colour and was very hazy. Precipitation removed most of this colour giving a nearly white calcium alginate/alginic acid. The same calcium/gelling issue as described in Experiment 10 was present in this experiment.

Example 12: Acid Bleaching Process (Acid/Sodium Chlorite) (No Ion Exchange) After Extraction Only

Water Wash 500 g of milled stipe portions (equivalent to 1 kg of original milled stipe portions that had lost 50% of its weight during pressing) was placed into a 5 litre beaker. 1.5 kg of water was then added at a ratio of 3:1 (water:milled stipe portions) to make the mixture fluid. The water was around 40° C. and the mixture was stirred for approximately 30 minutes. After this time had elapsed the mixture was allowed to free drain and was then pressed to remove any remaining water.

Extraction

The milled stipe portions now weighing approximately 650 g were returned to a 5 litre beaker, and approximately five times the weight of the milled stipe portions in water (at 50° C.) is added to the beaker to make the mixture fluid. To the stirring beaker, 300 ml of sodium carbonate (16% w/v) was added to raise the pH to approximately 11. The mixture was stirred for around 2 hours (more water can be added during this time if required). After 2 hours had elapsed, the slurry was centrifuged to separate the solids from the liquor. The liquor was then decanted from the solids.

Precipitation

The alginate was precipitated as follows using calcium chloride (9% v/v). 400 ml of this mixture was used to precipitate the 8 litre volume of sodium alginate into calcium alginate. The calcium alginate was then washed and drained the run off liquid was clear. The mixture was then macerated and washed and drained again until the run off liquid was clear.

Acid Bleaching (Hydrochloric Acid and Sodium Chlorite Wash)

This was the final decolouration stage in the process and was carried out on solid alginic acid. At this point the calcium alginate and the alginic acid mixture are changed into alginic acid only.

1 litre of hydrochloric acid (1M) was added to the alginate mixture to convert the calcium alginate present to alginic acid. Then 6 ml of sodium chlorite (25% w/v) was also added to bleach the alginic acid. This was left to sit for 1 hour and 45 minutes. After this time had elapsed, the alginic acid was drained and washed/drained until the pH was approximately 3 to 3.5 and the run-off water was running clear. At this point the alginic acid was a yellow/white colour but still cloudy.

The alginic acid was returned to sodium alginate sodium carbonate (16% w/v). Once the mixture had totally dissolved into solution it was obvious that there was still calcium present within the sodium alginate liquor as behaved more like a gel than a fluid. To remove this excess calcium, the liquor was re-precipitated using 200 ml of 1M HCl. Once re-precipitated, the alginic acid was then washed and drained until the liquid running off was clear and the pH had reached 3 to 3.5. The alginic acid was then re-solubilised using sodium carbonate (16% w/v). The sodium alginate was then dried and milled.

Comments on Results

The main difference in this experiment from Experiment 6 was that no ion exchange was carried out before extraction. The colour of the slurry during the extraction quickly darkened once the pH rose above 7. This resulted in a very brown residue and liquor. Precipitation removed most of this colour giving a nearly white calcium alginate/alginic acid. The same calcium/gelling issue as described in Experiments 10 and 11 was present in this experiment.

Example 13: Alkaline Bleaching Process (Sodium Percarbonate/TAED) After Extraction of Alginate Water Wash 500 g of milled stipe portions (equivalent to 1 kg of original milled seaweed that has lost 50% of its weight during pressing) was placed into a 5 litre beaker. 1.5 kg of water was then added at a ratio of 3:1 (water:milled stipe portions) to make the mixture fluid. The water was around 40° C. and the mixture is stirred for approximately 30 minutes. After this time had elapsed, the mixture was allowed to free drain and was pressed to remove any remaining water.

Alkaline Only Wash (No Bleaching)

The milled stipe portions now weighing 650 g were again added to a 5 litre beaker along with 1.95 kg of water (3:1 ratio; water:milled stipe portions) to make the mixture fluid. Sodium carbonate powder was then added to the vessel to allow the pH to rise to around pH 10. This was then mixed for up to 10 minutes. After this time had elapsed, the milled stipe portions were allowed to free drain and were pressed to remove any remaining free liquid. There was no major change in the appearance of the milled stipe portions at this stage.

Acid Only Wash (No Bleaching)

The milled stipe portions now weigh 682.5 g (a 5% increase in weight) and were returned to a 5 litre plastic beaker. 2 kg of water was added (3:1 ratio; water:milled stipe portions) allowing the milled stipe portions to become fluid. Up to 200 ml of sulphuric acid (1M $H_2SO_4$) was then added to the beaker to lower the pH to the range pH 2 to 2.2. This was stirred for up to 30 minutes to allow ion exchange (calcium alginate to alginic acid) to occur. After this time had elapsed, the milled stipe portions were allowed to free drain and were then washed and pressed to remove any remaining free liquid and acidity. There was a noticeable difference in the colour of the milled stipe portions; they were green in colour when compared to the original milled stipe portions and weighed approximately 310 g.

In order to ensure complete ion-exchange of the calcium alginate to alginic acid, a second acid wash was carried out on the milled stipe portions, with the addition of 60 ml of sulphuric acid (1M $H_2SO_4$) and 600 ml water. After stirring for 20 minutes, the material was allowed to free drain and pressed to remove excess free acid. The pressed solid was then thoroughly washed with water to a slurry pH in the range 3.1 to 3.2 and re-pressed to remove excess liquid.

Extraction

The milled stipe portions now weighing approximately 280 g were transferred into a 5 litre beaker and approximately five times the weight of the milled stipe portions in water (at 50° C.) was added to the beaker to make the mixture fluid. 12 g to 16 g of sodium carbonate was added to the beaker to raise the pH to between 7 and 9.5. The slurry was stirred for up to 1 hour (more water may need to be added if the slurry becomes too thick).

TAED Addition

The following steps were carried out before the sodium alginate slurry was separated into sodium alginate liquor and residue.

The pH of the slurry was checked (it should ideally be between pH 9 and 10). If the pH needs to be adjusted, sodium carbonate can be added. Hydrogen peroxide (35%) and TAED were then added in a ratio of 2:1 (e.g., if 2 ml of $H_2O_2$ is added then 1 g of TAED will be added, but suitable ranges are TAED=1 g to 6 g and 35% $H_2O_2$=2 ml to 12 ml). This was then allowed to react for approximately 30 minutes (but a suitable range is from 20 mins to 4 hours). After the allotted time had elapsed, the slurry was centrifuged to separate the solids from the liquor (a significant colour change of the precipitate from brown to colourless to pale yellow was noted). The liquor was then decanted from the solids.

The liquor can be precipitated and/or converted between sodium alginate, alginic acid and calcium alginate as described above, and optionally then dried.

Example 14: Alkaline Bleaching Process (Sodium Percarbonate/TAED) After Extraction and Precipitation of Alginate Water Wash 500 g of milled stipe portions (equivalent to 1 kg of original milled seaweed that has lost 50% of its weight during pressing) was placed into a 5 litre beaker. 1.5 kg of water was then added at a ratio of 3:1 (water:milled stipe portions) to make the mixture fluid. The water was around 40° C. and the mixture was stirred for approximately 30 minutes. After this time had elapsed, the mixture was allowed to free drain and was then pressed to remove any remaining water.

Alkaline Only Wash (No Bleaching)

The milled stipe portions now weighing 650 g were again added to the 5 litre beaker along with 1.95 kg of water (3:1 ratio; water:milled stipe portions) to make the mixture fluid. Sodium carbonate was then added to the vessel to allow the pH to rise to around pH 10. This was then mixed for up to 10 minutes. After this time had elapsed, the milled stipe portions were allowed to free drain and were pressed to remove any remaining free liquid. There was no major change in the appearance of the milled stipe portions at this stage.

Acid Only Wash (No Bleaching)

The milled stipe portions now weigh 682.5 g (a 5% increase in weight) and were returned to the 5 litre plastic beaker. 2 kg of water was added (3:1 ratio; water:milled stipe portions) allowing the milled stipe portions to become fluid. Up to 200 ml of sulphuric acid (1M $H_2SO_4$) was then added to the beaker to lower the pH to the range 2 to 2.2. This was stirred for up to 30 minutes to allow ion exchange (calcium alginate to alginic acid) to occur. After the time had elapsed, the milled stipe portions were allowed to free drain and were then washed and pressed to remove any remaining free liquid and acidity. There was a noticeable difference in the colour of the milled stipe portions; they were green in colour when compared to the original milled stipe portions and weighed approximately 320 g.

In order to ensure complete ion-exchange of the calcium alginate to alginic acid, a second acid wash was carried out on the milled stipe portions, with the addition of 60 ml of sulphuric acid (1M $H_2SO_4$) and 600 ml water. After stirring for 20 minutes, the material was allowed to free drain and pressed to remove excess free acid. The pressed solid was then thoroughly washed with water to a slurry pH in the range 3.1 to 3.2 and re-pressed to remove excess liquid.

Extraction

The milled stipe portions now weighing approximately 280 g were transferred into a 5 litre beaker and approximately five times the weight of the milled stipe portions in water (at 50° C.) was added to the beaker to make the mixture fluid. 12 to 16 g of sodium carbonate powder was added to the beaker to raise the pH to between 7 and 9.5. The slurry was stirred for up to 1 hour (more water may need to be added if the slurry becomes too thick).

Precipitation

The alginate was then precipitated as follows. The precipitation (conversion of the alginate from a sodium to a calcium form) was effected by using calcium chloride (conveniently as a 9% v/v liquor). 120 ml of the 9% v/v calcium chloride was added to the sodium alginate liquor to precipitate calcium alginate, which was then washed and drained until the run off liquid was clear. The mixture was then macerated and washed, drained and lightly pressed until the run off liquid was clear.

TAED Addition

This was carried out on the calcium alginate precipitate. The macerated calcium alginate was added to water to create a slurry. The pH of the slurry is checked (it should ideally be between pH 8 and 10). If the pH needs to be adjusted sodium carbonate can be added. Hydrogen peroxide (35%) and TAED are then added in a ratio of 2:1 (e.g., if 2 ml of $H_2O_2$ is added then 1 g of TAED will be added, although suitable ranges are TAED=1 g to 6 g and 35% $H_2O_2$=2 ml to 12 ml). After the allotted time had elapsed, the calcium alginate was separated from the free liquid and washed thoroughly with ambient temperature water (a significant colour change of the precipitate from brown to colourless to pale yellow was noted).

The liquor can be precipitated and/or converted between sodium alginate, alginic acid and calcium alginate as described above, and optionally then dried.

Example 15: Different Neutral or Alkaline pH Values

Below there are examples of the neutral or alkaline bleaching step carried out at different pH values. The bleaching was carried out at four different pH values (7, 7.5, 8.5 and 9.5) at around 35° C. to 40° C.

pH 7

Milled stipe portions and water were added to a beaker; the pH of this was approximately 7. 5 ml of peracetic acid (PERACLEAN™ 15) were added and the mixture stirred. This was left to react for 5 minutes. The bleaching effect worked well and rapidly.

pH 7.5

Milled stipe portions and water were added to a beaker; the pH of this was approximately 7.5. 8 ml of $H_2O_2$ (35%) was added, then 4 g of TAED. This was left to react for 30 mins. The bleaching effect worked but not as well as at higher pH values and took longer.

pH 8.5

Milled stipe portions and water were added to a beaker. 0.5 ml $Na_2CO_3$ (16% w/v) was added to increase the pH before 8 ml of $H_2O_2$ (35%) was added, then 4 g of TAED. This was left to react for 20 mins. The bleaching effect worked but took longer than at higher pH values.

pH 9.5

Milled stipe portions and water were added to a beaker. 2 ml $Na_2CO_3$ (16% w/v) was added to increase the pH before 8 ml of $H_2O_2$ (35%) was added, then 4 g of TAED. This was left to react for 10 mins. The bleaching effect worked in quickly and effectively.

Summary of Results

The above results show that different pH values work effectively, although lower pH values take longer.

Example 16: Different Pressures

After the water washing, alkali bleaching and acid bleaching, extraction was carried out on 4×600 g samples. These samples were subjected to extraction over different time durations, and at different pressures (using a pressure cooker), to observe a depolymerisation effect. The different experiments are detailed below:

11 Minutes in Pressure Cooker 600 g of water washed, alkali bleached and acid bleached milled stipe portions were added to the pot for a pressure cooker, then 1,200 g of water was also added. The pot was placed into the pressure cooker and the setting was selected to approx. 1 bar (approx. 15 PSI or 104 kPa). The pressure may be greater that atmospheric pressure and to up to 2 bar (approx. 30 PSI or 208 kPa).

Once up to operating pressure and temperature, the pressure cooker was run for 5 minutes. The pressure cooker took 6 minutes to reach operating pressure and temperature, so the milled stipe portions were in the pressure cooker for a total of 11 minutes. Once the pressure cooker cycle was finished, the temperature was taken (this was approximately 100° C.). However, under higher pressure (up to 1 bar) this temperature would have been higher, (possibly as high as 121° C.). The milled stipe portions were then rinsed and pressed.

The milled stipe portions were then subjected to extraction as outlined above (e.g., using $Na_2CO_3$ to take to pH7 etc.).

6 Minutes in Pressure Cooker 600 g of water washed, alkali bleached and acid bleached milled stipe portions were added to the pot for a pressure cooker, then 1,200 g of water was also added. The pot was placed into the pressure cooker and the setting was selected to approx. 1 bar (approx. 15 PSI or 104 kPa). The pressure may be greater that atmospheric pressure and to up to 2 bar (approx. 30 PSI or 208 kPa).

The pressure cooker took 6 minutes to reach operating pressure and temperature, and once this was met the pressure cooker was turned off. Once the pressure cooker cycle was finished, the temperature was taken (this was approximately 100° C.). However, under higher pressure (up to 1 bar) this temperature would have been higher, (possibly as high as 121° C.). The milled stipe portions were then rinsed and pressed.

The milled stipe portions were then subjected to extraction as outlined above (e.g., using $Na_2CO_3$ to take to pH7 etc.).

3 Minutes in Pressure Cooker (Halfway to Operational Pressure)

600 g of water washed, alkali bleached and acid bleached milled stipe portions were added to the pot for a pressure cooker, then 1,200 g of water was also added. The pot was placed into the pressure cooker and the setting was selected to approx. 1 bar (approx. 15 PSI or 104 kPa). The pressure may be greater that atmospheric pressure and to up to 2 bar (approx. 30 PSI or 208 kPa).

The pressure cooker would normally take 6 minutes to reach operating pressure and temperature, but once the pressure cooker had been on for 3 minutes the pressure cooker was turned off. Once the pressure cooker cycle was finished, the temperature was taken (this was approximately 70° C.). The milled stipe portions were then rinsed and pressed.

The milled stipe portions were then subjected to extraction as outlined above (e.g., using $Na_2CO_3$ to take to pH7 etc.).

Boiling Water (No Pressure Cooker—Atmospheric Pressure)

600 g of water washed, alkali bleached and acid bleached milled stipe portions were added to a beaker, then 1,200 g of water was also added. This was then insulated (to contain the heat) and allowed to sit for 11 minutes. The temperature was then taken; this was approximately 80° C. The milled stipe portions were then rinsed and pressed.

The milled stipe portions were then subjected to extraction as outlined above (e.g., using $Na_2CO_3$ to take to pH7 etc.).

The bleaching processes described above are relatively fast, can be carried out at low temperature, and use non-aggressive, environmentally friendly chemicals. For example, the bleaching processes do not require the use of formaldehyde or the like or hypochlorite bleaches, both of which are environmentally unsound and/or toxic to humans, plants and animals.

Furthermore, the bleaching processes described have a significant effect on seaweed extract, reducing the colouration to provide alginates or celluloses or the like that are white or lightly yellow coloured when dry/solid and colourless or lightly yellow when liquids or when in solution. This provides for extracts that are useable in a wide range of applications such as, for example, foodstuffs and the like and other industrial uses where low or no colouration is required.

Whilst the above process has been described in the context of obtaining alginate, it will be appreciated that other target chemical species could be obtained such as, for example, cellulose or a cellulose/alginate mixture. Also, whilst the above process has been described in relation to *Laminaria hyperborea*, other seaweeds (macroalgae) may be used such as, for example, *Laminaria digitata, Lessonia trabeculata, Lessonia flavicans*, and *Lessonia brasiliensis*. Other brown seaweeds such as *Ascophyllum nodosum* or *Macrocystis pyrifera* can be used.

In one embodiment, there is provided a target chemical species, optionally alginate, prepared by the process outlined herein.

The target chemical species obtained from the processes described can be used in applications that require low levels of colour, for example, where the target chemical species is alginate.

In addition to the above, often it is necessary to use alginates that are colourless, or light in colour, so that the colour of the products to which they are added is not tainted by the colour of the alginates. However, most seaweed is dark in colour, the dark colour being provided primarily by polyphenols and/or other coloured compounds. In known processes, such coloured compounds can be removed or fixed using formaldehyde.

However, generally speaking it is preferred to avoid the use of formaldehyde. This is because under the CLP (Harmonised Classification, Labelling and Packaging) Regulation for substances and mixtures (1272/2008/EC), formaldehyde is classified under Category 2—"Suspected Human Carcinogen". Therefore, there are at least potential environmental and safety issues when using formaldehyde. Therefore, it may be undesirable to have formaldehyde in alginates, and in particular, in alginates that are to be ingested or used in or on the human body.

The process of the present invention eliminates the use of formaldehyde, which historically has been used as a colour setting and/or a bacteriostatic agent in the extraction and production of alginate. Thus, by avoiding the use of formaldehyde, the process of the present invention provides a significant advantage over existing processes. Likewise, the process of the present invention eliminates the use of hypochlorite bleaches, which can be corrosive to apparatus, dangerous to humans, plants and animals. Thus, by avoiding the use of hypochlorite, the process of the present invention provides a significant advantage over existing processes.

Furthermore, the process of the present invention enables alginate to be produced having predictable chemical and physical properties, such as specific molecular weight range, viscosity and purity. This is important as each of these factors impacts whether an alginate is suitable for a particular use. Without wishing to be bound by theory, it is thought that a combination of low colourant compound content and relatively small and consistent particle size distribution enables the production of alginate having predictable chemical and physical properties, such as specific molecular weight range, viscosity and purity.

Thus, the present invention provides alginates that have predictable and pre-selectable chemical and physical properties.

While this invention has been described with reference to the sample embodiments thereof, it will be appreciated by those of ordinary skill in the art that modifications can be made to the structure and elements of the invention without departing from the spirit and scope of the invention as a whole.

The invention claimed is:

1. A process for obtaining alginate, alginic acid, or a salt thereof; or cellulose from seaweed, said process comprising the steps of:
   (i) providing a seaweed portion comprising a stipe;
   (ii) removing at least a portion of an outwardly facing surface of the stipe;

(iii) bleaching the seaweed portion comprising the stipe that has had at least a portion of its outwardly facing surface removed; and (iv) extracting the alginate, alginic acid, or a salt thereof; or cellulose from the seaweed portion comprising the stipe that has had at least a portion of its outwardly facing surface removed;

wherein the bleaching comprises a first neutral or alkaline bleaching step that precedes the extraction step, the first neutral or alkaline bleaching step comprising using a bleaching composition under neutral or alkaline conditions, and wherein the bleaching further comprises a first acid bleaching step that precedes the extraction step, the first acid bleaching step comprising using a bleaching composition under acid conditions and wherein the acid bleaching step is carried out at a pH of between approximately 1 and approximately 3.

2. The process of claim 1, wherein the bleaching comprises a second neutral or alkaline bleaching step, the second neutral or alkaline bleaching step comprising using a bleaching composition under neutral or alkaline conditions, optionally wherein the second neutral or alkaline bleaching step follows the extraction step.

3. The process of claim 1, wherein the neutral or alkaline bleaching step is an alkaline bleaching step comprising using a bleaching composition under alkaline conditions, wherein optionally the alkaline bleaching step is carried out at a pH of between approximately 8.5 and approximately 10.5.

4. The process of claim 1, wherein the neutral or alkaline bleaching step is carried out at a temperature of between approximately 30° C. and approximately 50° C.

5. The process of claim 1, wherein the neutral or alkaline bleaching step is carried for between approximately 2 minutes and approximately 30 minutes.

6. The process of claim 1, wherein the neutral or alkaline bleaching composition comprises one or more of: a compound comprising a peroxide group, a compound comprising a peroxy acid group, a compound that acts as a source of a peroxide group, a compound that acts as a source of a peroxy acid group, hydrogen peroxide, a peroxide salt, a hydroperoxide, a carbonate salt, a carbonate ion, a percarbonate salt, 6-(phthalimido) peroxyhexanoic acid (PAP), and peracetic acid.

7. The process of claim 1, wherein the neutral or alkaline bleaching composition comprises one or more of: an oxidation catalyst, a peroxide activator and a peroxy acid activator.

8. The process of claim 1, wherein the bleaching comprises a second acid bleaching step, the second acid bleaching step comprising using a bleaching composition under acid conditions, optionally wherein the second acid bleaching step follows the extraction step.

9. The process of claim 1, wherein the acid bleaching step is carried out at a temperature of between approximately 15° C. and approximately 40° C.

10. The process of claim 1, wherein the acid bleaching step is carried for between approximately 10 minutes and approximately 120 minutes.

11. The process of claim 1, wherein the acid bleaching composition comprises one or more of: a compound comprising a chlorite group, and a compound that acts as a source of a chlorite group.

12. The process of claim 1, further comprising an aqueous wash step, optionally wherein the aqueous wash step precedes the first neutral or alkaline bleaching step.

13. The process of claim 12, wherein the aqueous wash step is carried out at a temperature of between approximately 15° C. and approximately 80° C.

14. The process of claim 12, wherein the aqueous wash step is carried for between approximately 5 minutes and approximately 40 minutes.

15. The process of claim 1, further comprising the step of pressing the seaweed portion to remove fluid therefrom, optionally wherein the pressing step precedes the first neutral or alkaline bleaching step.

16. The process of claim 15, wherein the pressing step is carried out at a pressure of from approximately 5 PSI (34.5 kPa) to approximately 50 PSI (345 kPa).

17. The process of claim 1, further comprising an ion exchange step, optionally wherein the ion exchange step follows the first neutral or alkaline bleaching step.

18. The process of claim 17, wherein the ion exchange step further comprises the addition of acid, optionally to obtain a pH of between approximately 1.8 and approximately 3.5.

19. The process of claim 17, wherein the ion exchange step is carried out for between approximately 5 minutes and approximately 60 minutes.

20. The process of claim 1, further comprising a precipitation step, optionally wherein the precipitation step follows the extraction step.

21. The process of claim 1, wherein the extraction step is carried out at a pH of between approximately 6 and approximately 11.

22. The process of claim 1, wherein the extraction step is carried out at a temperature of between approximately 20° C. and approximately 60° C.

23. The process of claim 1, wherein the extraction step is carried out for between approximately 10 minutes and approximately 180 minutes.

24. The process of claim 1, wherein the process comprises the further step of dividing the stipe into a plurality of portions by: (i) cutting; optionally followed by (ii) milling.

25. The process of claim 1, wherein the seaweed is selected from one or more of the group consisting of: *Laminaria hyperborea*, *Laminaria digitata*, *Lessonia trabeculata*, *Lessonia flavicans*, and *Lessonia brasihensis*.

26. The process of claim 1, the process comprising the further step of depolymerisation of the alginate or a salt thereof, optionally alginic acid or a salt thereof, optionally wherein the depolymerisation follows the first neutral or alkaline bleaching step and precedes the extraction step.

27. The process of claim 26, wherein the depolymerisation is carried out at a temperature of between approximately 70° C. and approximately 130° C.

28. The process of claim 26, wherein the depolymerisation is carried out at a pressure of between approximately 0 PSI (0 kPa) and approximately 30 PSI (208 kPa).

29. The process of claim 26, wherein the depolymerisation is carried out at a pH of from approximately 2.5 to approximately 9.

* * * * *